United States Patent
Tamura et al.

(10) Patent No.: US 7,871,740 B2
(45) Date of Patent: Jan. 18, 2011

(54) ELECTRODE FOR FUEL CELL, MEMBRANE ELECTRODE COMPOSITE AND FUEL CELL, AND METHOD FOR MANUFACTURING THEM

(75) Inventors: Jun Tamura, Yokohama (JP); Yoshihiko Nakano, Yokohama (JP); Wu Mei, Yokohama (JP); Satoshi Mikoshiba, Yamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 559 days.

(21) Appl. No.: 11/778,937

(22) Filed: Jul. 17, 2007

(65) Prior Publication Data
US 2008/0026282 A1    Jan. 31, 2008

(30) Foreign Application Priority Data
Jul. 31, 2006    (JP)    ............... 2006-208241

(51) Int. Cl.
*H01M 4/02* (2006.01)
(52) U.S. Cl. ...................... 429/532; 429/523
(58) Field of Classification Search ............... None
See application file for complete search history.

(56) References Cited

U.S. PATENT DOCUMENTS

| | | | |
|---|---|---|---|
| 2005/0084740 A1* | 4/2005 | Lyons et al. .......... | 429/40 |
| 2006/0019148 A1 | 1/2006 | Tamura et al. | |
| 2007/0082257 A1 | 4/2007 | Tamura et al. | |
| 2007/0134533 A1 | 6/2007 | Tamura et al. | |

FOREIGN PATENT DOCUMENTS

| JP | 2001-102071 | | 4/2001 |
|---|---|---|---|
| JP | 2004-158261 | | 6/2004 |
| JP | 2005-149742 | * | 6/2005 |
| JP | 2005-174869 | | 6/2005 |
| JP | 2005-270864 | | 10/2005 |

(Continued)

OTHER PUBLICATIONS

Machine translation of JP 2005-270864.*

(Continued)

*Primary Examiner*—Patrick Ryan
*Assistant Examiner*—Cynthia Lee
(74) *Attorney, Agent, or Firm*—Oblon, Spivak, McClelland, Maier & Neustadt, L.L.P.

(57) ABSTRACT

A fuel cell, which can supply stable output even at elevated temperatures and can maintain its power generation performance over a long period of time, can be realized by an electrode for a fuel cell comprising a catalyst layer formed of a catalyst composite and a binder, the catalyst composite comprising a proton-conductive inorganic oxide and an oxidation-reduction catalyst phase supported on the proton-conductive inorganic oxide, the proton-conductive inorganic oxide comprising a catalyst carrier selected from tin(Sn)-doped $In_2O_3$, fluorine(F)-doped $SnO_2$, and antimony(Sb)-doped $SnO_2$ and an oxide particle phase chemically bonded to the surface of the catalyst carrier. The catalyst composite is manufactured by dispersing a catalyst carrier in a solution containing a material as a starting material for an oxide particle phase, heat treating the dispersion to form a proton-conductive inorganic oxide, further dispersing the proton-conductive inorganic oxide in a catalyst precursor-containing solution, and subjecting the dispersion to heat treatment or pH adjustment to deposit a catalyst phase.

13 Claims, 3 Drawing Sheets

FOREIGN PATENT DOCUMENTS

JP          2006-32287          2/2006

OTHER PUBLICATIONS

Machine translation of JP 2005-149742.*
U.S. Appl. No. 12/302,949, filed Dec. 1, 2008, Tamura, et al.
U.S. Appl. No. 12/372,135, filed Feb. 17, 2009, Tamura, et al.
U.S. Appl. No. 11/744,267, filed May 4, 2007, Jun Tamura, et al.
U.S. Appl. No. 12/050,397, filed Mar. 18, 2008, Nakano, et al.
Eiji Higuchi, et al. "Gas diffusion electrodes for polymer electrolyte fuel cells using borosiloxane electrolytes", Solid State Ionics 171 (2004) pp. 45-49.

* cited by examiner

ELECTRODE FOR FUEL CELL, MEMBRANE ELECTRODE COMPOSITE AND FUEL CELL, AND METHOD FOR MANUFACTURING THEM

CROSS-REFERENCE TO RELATED APPLICATIONS

This application is based upon and claims the benefit of priority from the prior Japanese Patent Applications No. 208241/2006, filed on Jul. 31, 2006; the entire contents of which are incorporated herein by reference.

BACKGROUND OF THE INVENTION

1. Field of the Invention

The present invention relates to an electrode for a fuel cell, comprising a proton conductor, a membrane electrode composite, and a fuel cell comprising a membrane electrode composite. The present invention also relates to a method for manufacturing them.

2. Background Art

Fuel cells comprise a fuel electrode (anode) provided on one side of a proton-conductive film and an oxidizing agent (oxidizer) electrode (cathode) provided on the other side of the proton-conductive film. Upon the supply of a fuel such as hydrogen or methanol to the anode, the fuel is electrochemically oxidized in the anode to generate protons and electrons. The generated electrons flow into an external circuit. The protons thus produced arrive at the cathode through the proton-conductive film and are reacted with an oxidizing agent supplied to the cathode and electrons from an external circuit to produce water.

Excellent proton-conductive properties are required of both the anode and cathode. For example, perfluorosulfonic acid-containing polymers (for example, Nafion (tradename, manufactured by Du Pont)) are known as the proton conductor. From the viewpoint of reducing fuel cell systems, for example, methanol as a liquid fuel is in many cases used in a high concentration. The perfluorosulfonic acid-containing polymer, when used as the proton-conductive binder in an electrode catalyst layer, is dissolved in highly concentrated methanol. In particular, the dissolution of the perfluorosulfonic acid-containing polymer is promoted by power generation at a high temperature of 100° C. or above, which provides high output, or by a temperature rise caused by heat generation involved in the power generation. Accordingly, it is difficult to provide stable output.

A sulfuric acid-supported metal oxide having solid superacidity is known as an inorganic solid acid-based proton conductor (see, for example, JP-A 2004-158261 (KOKAI)). Specifically, the sulfuric acid-supported metal oxide has been produced by supporting sulfuric acid on the surface of an oxide containing at least one element selected from zirconium, titanium, iron, tin, silicon, aluminum, molybdenum, and tungsten and heat treating the assembly to fix sulfuric acid on the surface of the oxide. The sulfuric acid-supported metal oxide develops proton conductivity by virtue of the fixed sulfate group. However, the sulfate group is eliminated by hydrolysis, and the proton conductivity is lowered. Accordingly, the proton-conductive solid electrolyte is unstable as a proton-conductive solid electrolyte in a fuel cell which produces water in the course of power generation, particularly a fuel cell using a liquid fuel, and thus is possibly unsuitable for stable supply of electric power for a long period of time.

Further, Eiji Higuchi, Hiroyuki Uchida, Tatsuo Fujinami, and Masahiro Watanabe et al., Solid State Ionics, 171, 45-49 (2004) describes a sulfonic acid group-containing borosiloxane proton-conductive solid electrolyte as a proton-conductive inorganic binder in the electrode catalyst layer. In this case, a sol solution of a metal alkoxide as a starting material of the sulfonic acid group-containing borosiloxane is mixed with catalyst particles, and the resultant slurry is coated onto carbon paper, and the coating is heat treated for use of the sulfonic acid group-containing borosiloxane proton-conductive solid electrolyte as a binder for the catalyst layer. As with the perfluorosulfonic acid-containing polymer, the sulfonic acid group-containing borosiloxane electrolyte requires a large amount of water (carrier water) for proton conduction through the sulfonic acid group. In the power generation under high temperatures at which it is difficult to ensure water, water necessary for proton conduction is reduced, and the proton conductivity is significantly lowered. Further, since there is a possibility that the sulfonic acid group is eliminated, the sulfonic acid group-containing borosiloxane electrolyte is considered as a material unsuitable for stable supply of electric power for a long period of time.

Furthermore, JP-A 2001-102071 (KOKAI) describes that an inorganic glass containing $P_2O_5$ and $SiO_2$ is used as a proton-conductive inorganic material in an electrode catalyst layer. In this case, a sol or wet gel containing metal alcolates as starting materials for the inorganic glass containing $P_2O_5$ and $SiO_2$ is coated onto the surface of each electrode in a fuel electrode and an oxidizer electrode, and the coating is dried and heated to bind the catalyst layer to prepare electrodes. The inorganic glass containing $P_2O_5$ and $SiO_2$ utilizes OH groups on the glass surface for proton conduction. In the operation under high temperatures, however, the OH groups are eliminated upon drying resulting in lowered proton conductivity. Further, since there is a possibility that the $P_2O_5$ component for glass skeleton formation is dissolved in water, it is difficult to stably supply electric power for a long period of time.

The possession of high electron conductivity and proton conductivity by satisfactorily forming the continuity between catalysts or catalyst supporting materials, or the continuity of the proton conductor is necessary in the anode and cathode. Further, a number of three-phase interfaces as a reaction field should be formed by bringing the electron conductor into contact with the proton conductor. JP-A 2005-149742 (KOKAI) describes that an electroconductive metal oxide is used in a catalyst carrier in an electrode catalyst layer. In this case, the effect of long-term stability is recognized. Since, however, the catalyst carrier does not have any proton conductivity, it is considered that the utilization efficiency of the catalyst and the formation of the three-phase interfaces are unsatisfactory.

The present inventors have proposed, for example, electrodes for fuel cells, comprising an oxide carrier such as titanium (Ti), particles of an oxide of tungsten (W) or the like, a catalyst-supported carbon, and a polymer binder for binding them to each other (JP-A 2006-032287 (KOKAI)). In such electrodes for fuel cells and the like, water can easily be controlled, and it is considered that stable ion conductivity can be maintained over a temperature range from room temperature to a high temperature around 150° C.

An electrolyte membrane prepared by compositing an oxide of titanium (Ti), tungsten (W) or the like (an oxide superacid), a catalyst-supported carbon, and an organic polymer binder with each other is considered to have a structure in which the continuity between catalyst-supported carbons, the continuity between oxide superacids, and the continuity between the catalyst-supported carbon and the oxide superacid are less likely to be formed. Consequently, there is a possibility that the three-phase interface which causes an electrode reaction cannot be satisfactorily formed.

SUMMARY OF THE INVENTION

According to the present invention, there is provided an electrode for a fuel cell comprising a catalyst layer, wherein the catalyst layer comprising
a catalyst composite and
a binder,
where the catalyst composite comprising
a proton-conductive inorganic oxide and
an oxidation-reduction catalyst phase,
the proton-conductive inorganic oxide comprising
a catalyst carrier comprising at least one material selected from the group consisting of tin(Sn)-doped $In_2O_3$, fluorine (F)-doped $SnO_2$, and antimony(Sb)-doped $SnO_2$ and
an oxide particle phase chemically bonded to the surface of the catalyst carrier and comprising at least one element selected from the group consisting of tungsten (W), molybdenum (Mo), chromium (Cr), vanadium (V), and boron (B),
the oxidation-reduction catalyst phase being supported on the catalyst carrier directly or through the oxide particle phase.

According to the present invention, there are also provided a membrane electrode composite and a fuel cell comprising the above electrode for a fuel cell.

According to the present invention, there is further provided a method for manufacturing an electrode for a fuel cell comprising:
dispersing a catalyst carrier in a solution containing a substance comprising at least one element, selected from the group consisting of tungsten (W), molybdenum (Mo), chromium (Cr), vanadium (V), and boron (B), dissolved therein, the catalyst carrier comprising at least one material selected from the group consisting of tin(Sn)-doped $In_2O_3$, fluorine(F)-doped $SnO_2$, and antimony(Sb)-doped $SnO_2$;
removing the solvent from the dispersion;
heat treating the residue to form a phase of an oxide of element Y and thus to form a proton-conductive inorganic oxide;
dispersing the proton-conductive inorganic oxide in a solution containing a metal element-containing substance as a catalyst precursor dissolved therein;
removing the solvent from the dispersion or adjusting pH of the dispersion to deposit a catalyst precursor on the surface of the proton-conductive inorganic oxide;
heat treating the system in a reducing atmosphere to form a catalyst composite; and
mixing the catalyst composite with a binder and molding the mixture or coating the mixture onto a support.

The present invention can provide an electrode for a fuel cell, a membrane electrode composite and a fuel cell that can supply stable output over a temperature range from room temperature to even elevated temperatures around 150° C. and can maintain power generation performance over a long period of time.

DETAILED DESCRIPTION OF THE INVENTION

Figure 1:
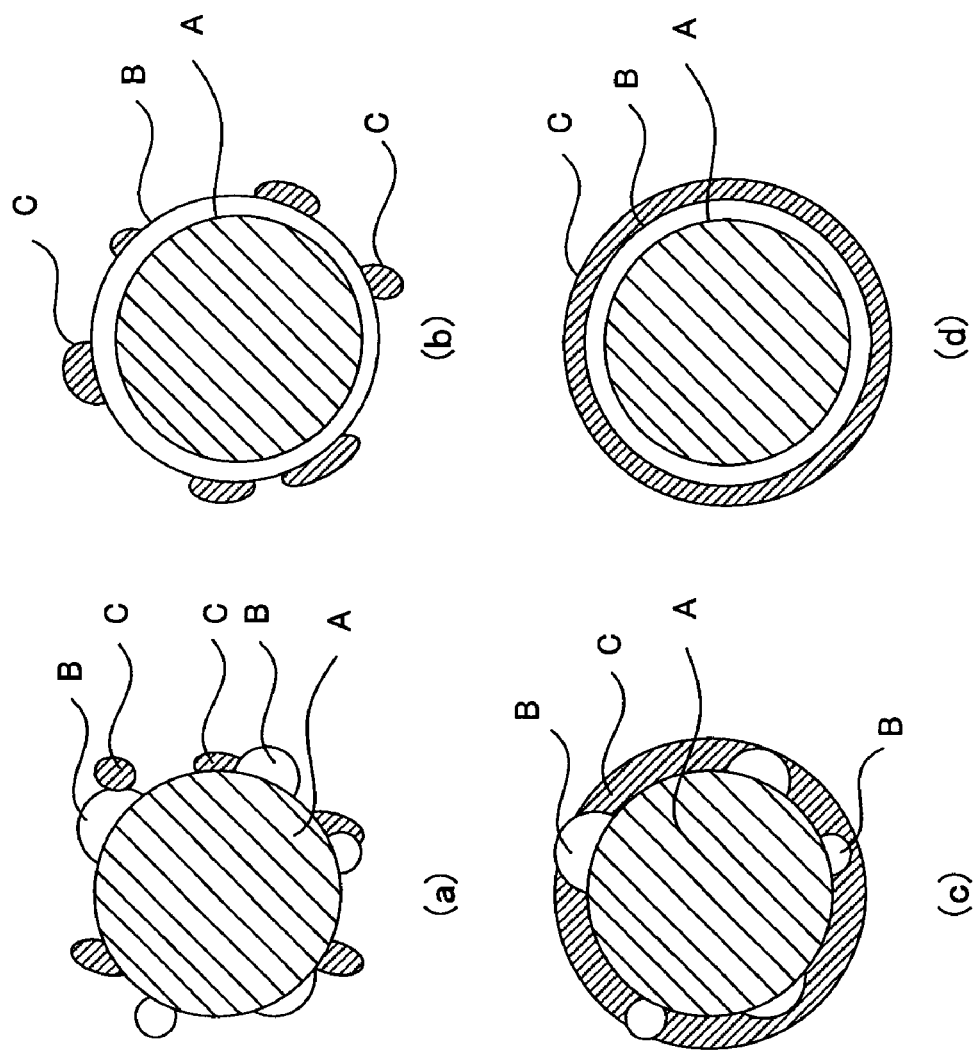
FIG. 1 is a typical cross-sectional view of an embodiment of the structure of the catalyst composite according to the present invention.

Embodiments of the present invention will be described in more detail with reference to the accompanying drawings. Like constructions have the same reference characters throughout the description of the embodiments and working examples, and the overlapped description thereof will be omitted.

First Embodiment

At the outset, an electrode for a fuel cell in a first embodiment of the present invention will be described.

The electrode for a fuel cell in this embodiment comprises a catalyst layer comprising a proton-conductive inorganic oxide with an oxidation-reduction catalyst supported thereon and an organic polymer binder. The catalyst layer mainly functions as a reaction field for an oxidation-reduction reaction of a fuel and an oxidizing agent in the electrode for a fuel cell. The catalyst layer also functions as a transfer layer for protons and electrons which are produced and consumed by the oxidation-reduction reaction.

The catalyst layer in this embodiment comprises a proton conductor having electron conductivity and an inorganic oxide. This inorganic oxide comprises
a catalyst carrier comprising at least one material selected from the group consisting of tin(Sn)-doped $In_2O_3$, fluorine (F)-doped $SnO_2$, and antimony(Sb)-doped $SnO_2$,
an oxide particle phase provided on the surface of the catalyst carrier and comprising at least one element selected from the group consisting of tungsten (W), molybdenum (Mo), chromium (Cr), vanadium (V), and boron (B), and
a catalyst phase comprising an oxidation-reduction catalyst, supported on the catalyst carrier directly or through the oxide particle phase, and a binder.

The catalyst carrier (hereinafter often referred to as "catalyst carrier A") functions to recover, from the catalyst, electrons produced by an oxidation reaction of a fuel over a catalyst in an anode and to supply, to the catalyst, electrons necessary for an reduction reaction of an oxidizing agent over the catalyst to the catalyst in a cathode. Accordingly, the catalyst carrier should be electronically conductive. In the present invention, Sn-doped $In_2O_3$, F-doped $SnO_2$, and Sb-doped $SnO_2$ are used as the electroconductive catalyst carrier. These electroconductive catalyst carriers do not have proton conductivity, and the electron conductivity can be evaluated by a method which will be described later. The mechanism of electron conduction of the catalyst carrier is such that the replacement of a part of metal ions of $In_2O_3$ and $SnO_2$ as the base oxide with a metal ion having a high valence or the replacement of a part of oxygen ion with a fluorine ion having a low valence causes oxygen deficiency and increases free electrons with an increase in oxygen vacancy and results in the development of electron conductivity.

The catalyst carrier used in the present invention can be synthesized by using an existing method. Specifically, for example, an aqueous solution of a chloride, nitrate, hydroacid, oxoacid salt or the like containing a metal element in the base oxide or a doping metal element, or a metal alkoxide or fluorine ion-containing water-soluble or alcohol-soluble salt is used as a starting material. A target product can be prepared by preparing a homogeneous solution having a target composition based on this starting material solution, either subjecting the homogeneous solution, for example, to a sol-gel process or spraying to prepare a homogeneous precursor of a composite oxide, and heat treating the precursor. The heat treatment temperature is preferably 200° C. or above from the viewpoints of satisfactorily removing the starting material component contained in the precursor and forming the contemplated structure. On the other hand, the heat treatment temperature is preferably 600° C. or below from the viewpoint of preventing an increase in electrical resistance as a result of the loss of oxygen defects formed in the structure. Accordingly, the heat treatment temperature is preferably 200 to 600° C., more preferably 300 to 500° C.

The catalyst carrier used in the present invention has electrical characteristics which somewhat vary depending upon the synthetic method. For use as a catalyst carrier in fuel cells, however, the catalyst carrier preferably has a volume resistivity of $10^{-2}$ to $10^3$ $\Omega$cm. To this end, the level of a tin (Sn), fluorine (F) or antimony (Sb) element doped into $In_2O_3$ or $SnO_2$ as the base oxide is preferably 0.01 to 20% by mole. Further, from the viewpoint of lowering the resistance, the doping level of the tin (Sn), fluorine (F) or antimony (Sb) element is more preferably 0.1 to 10% by mole. The volume resistivity was evaluated by a four probe method using a compression molded product of powder of the catalyst carrier. In this method, the resistance is determined by arranging four needle-like electrodes (four probes) linearly on the surface of a molded product sample, allowing a given current to flow across the two outer probes and measuring the potential difference between the two inner probes.

The proton-conductive inorganic oxide can be prepared by chemically bonding a specific metal oxide to the surface of the catalyst carrier. Preferably, the preparation of the proton-conductive inorganic oxide by supporting the oxide on the surface of the catalyst carrier A is carried out by dispersing the catalyst carrier A in a solution containing a material comprising at least one element selected from the group consisting of tungsten (W), molybdenum (Mo), chromium (Cr), boron (B), and vanadium (V) (hereinafter referred to as "element Y") dissolved therein, for example, an aqueous solution of a chloride, nitrate, hydroacid, oxoacid salt or the like or an alcohol solution of a metal alkoxide, and removing the solvent to support the at least one element onto the catalyst carrier A, and heat treating the assembly to form a phase of an oxide of element Y (hereinafter often referred to as "oxide B"). However, it should be noted that the method for proton-conductive inorganic oxide preparation is not limited to the above method and may be any method. Further, a composite oxide comprising a plurality of types of the element Y may be supported on the catalyst carrier A. The support of the phase of the oxide B on at least a part of the surface of the catalyst carrier A suffices for contemplated results. For example, the phase of the oxide B may be unevenly distributed on the surface of the catalyst carrier A. Alternatively, the phase of the oxide B may be a layer provided so as to continuously cover the surface of the catalyst carrier A.

After the precursor of the oxide B is supported on the catalyst carrier A, the assembly is heat treated to form a bond between the oxides. In this case, however, the heat treatment temperature should be such that the electrical resistance of the catalyst carrier is not increased. The heat treatment temperature is preferably 200° C. or above from the viewpoint of satisfactorily forming a chemical bond between the catalyst carrier A and the oxide B to enhance the proton conductivity of the resultant oxide. On the other hand, from the viewpoint of preventing an increase in electrical resistance as a result of the loss of oxygen defects of the catalyst carrier, the heat treatment temperature is preferably 600° C. or below. Accordingly, the heat treatment temperature is preferably 200 to 600° C., more preferably 300 to 500° C.

The solubility of the oxide B varies depending upon elements and pH environment but is soluble in water. The formation of a chemical bond by firing this oxide B and the catalyst carrier A having no significant water solubility can suppress the dissolution of the oxide B in water and can enhance the stability of the proton-conductive inorganic oxide against water and the liquid fuel. Further, the contamination of other fuel cell materials and apparatuses with ions of eluted particles of the oxide B can also be avoided. Accordingly, this embodiment can realize high long-term reliability in the fuel cell.

Chemical bonding between the catalyst carrier A and the oxide B can be confirmed, for example, by X-ray diffractometry (XRD) in which a crystal lattice diffraction pattern inherent in a substance is obtained when the substance is a crystalline substance. Whether or not the crystalline substance has been bonded can be confirmed by comparing a diffraction pattern before the reaction with a diffraction pattern after the reaction. On the other hand, when the substance to be bonded is an amorphous substance, the presence of the amorphous substance cannot be confirmed from the diffraction pattern without difficulties. In this case, however, the presence of the amorphous substance can be confirmed by compositional analysis using equipment, for example, by atomic absorption spectroscopy. An energy dispersive X-ray spectroscopy (EDX), electron probe microanalysis (EPMA) or X-ray electron spectroscopy (XPS) can be used for the compositional analysis.

In this embodiment, in an oxide composite which functions as a proton-conductive inorganic oxide, chemical bonding between the catalyst carrier A and the oxide B suffices for contemplated results, and the crystallinity of the catalyst carrier A and the oxide B is not limited. When the promotion of Lewis acid site formation, the possibility of contribution to an improvement in acidity, a reduction in production cost, and easiness in the production process are taken into consideration, the oxide B is preferably amorphous. More preferably, the oxide B is amorphous, and the catalyst carrier A is crystalline. However, both the catalyst carrier A and the oxide B may be crystalline. Further, it is also possible to adopt such a combination that the oxide B is crystalline while the catalyst carrier A is amorphous.

The ratio between the number of moles of the element X contained in the catalyst carrier A, $M_X$, and the number of moles of the element Y contained in the oxide B, $M_Y$, that is, $M_Y/M_X$, is preferably not less than 0.001 from the viewpoint of satisfactorily maintaining the proton conduction field to enhance the proton conductivity. On the other hand, from the viewpoint of preventing a lowering in proton conductivity as a result of concealing the proton conduction field with the element Y-containing oxide particles B, the molar ratio ($M_Y/M_X$) is preferably not more than 20. Accordingly, the molar ratio between the element X in the catalyst carrier A and the element Y in the oxide B, i.e., $M_Y/M_X$, is preferably not less than 0.001 and not more than 20, more preferably not less than 0.01 and not more than 1.

In this embodiment, preferably, the proton-conductive inorganic oxide has solid superacidity. The proton dissociation degree can be represented by the acid strength, and the acid strength of a solid acid can be represented by the Hammett acidity function $H_0$. In the case of sulfuric acid, the $H_0$ value is −11.93. More preferably, the proton-conductive inorganic oxide has a solid superacidity of $H_0<−11.93$. The acidity of the proton-conductive inorganic oxide according to the present invention can be increased to $H_0=−20.00$ by optimizing the synthetic method. Accordingly, the acid strength of the proton-conductive inorganic oxide is preferably −20.00<$H_0$<−11.93.

The exact mechanism of proton conduction in the proton-conductive catalyst carrier has not been fully elucidated yet. However, it is believed that an oxide containing an element X comprising Sn and In elements in Sn-doped $In_2O_3$, F and Sn elements in F-doped $SnO_2$, or Sb and Sn elements in Sb-doped $SnO_2$, that is, the catalyst carrier A, is chemically bonded to an oxide B constituting the oxide particle phase containing at least one element Y selected from the group consisting of W, Mo, Cr, V and B to produce Lewis acid sites within the structure of the oxide B, and the Lewis acid sites are hydrated to form Broensted acid sites, whereby the proton conduction field is formed.

Since this proton-conductive inorganic oxide can cause a Lewis acid site-derived proton production reaction and, at the same time, can reduce the number of molecules of accompanied water necessary for proton conduction, a high level of proton conductivity can be realized by a small amount of water molecules present on the surface of the proton-conductive inorganic oxide. Accordingly, a high level of electric power generation can be realized without the necessity of strict water control during the power generation.

Thus, the incorporation of the catalyst layer in this embodiment in at least one of the fuel electrode and the oxidizer electrode can lower the cell resistance and can increase the maximum electric power generation of the fuel cell.

In this embodiment, the oxidation-reduction catalyst particles (hereinafter often referred to as "catalyst C") is supported directly on the surface of the catalyst carrier formed of at least one material selected from the group consisting of Sn-doped $In_2O_3$, F-doped $SnO_2$, and Sb-doped $SnO_2$. Alternatively, the catalyst C may be supported on the surface of the catalyst carrier through an oxide particle phase containing at least one element selected from the group consisting of W, Mo, Cr, V, and B supported on the surface of the catalyst carrier. This form of catalyst is used in at least one of a fuel electrode and an oxidizer electrode in a fuel cell.

Any desired catalyst particles may be used without particular limitation so far as they can function as a catalyst for an oxidation reaction for the fuel or as a catalyst for a reduction reaction of the oxidizing agent. Examples of such catalyst particles include particles of platinum, gold, silver, palladium, iridium, rhodium, ruthenium, iron, cobalt, nickel, chromium, tungsten, molybdenum, manganese, and vanadium. These catalyst particles may be used either solely or in the form of a multicomponent alloy. In particular, platinum has high catalytic activity and thus is used in many cases.

The oxidation-reduction catalyst can be supported by any method without particular limitation. For example, the catalyst can be supported on the proton-conductive inorganic oxide by dispersing the proton-conductive inorganic oxide in a solution containing a material containing a metal element as a catalyst precursor dissolved therein, for example, an aqueous solution of a chloride, nitrate, hydroacid or oxonic acid salt or an alcohol solution of a metal alkoxide, subjecting the dispersion to the removal of the solvent or pH adjustment to deposit a precursor of the catalyst on the surface of the proton-conductive inorganic oxide, and then heat treating the assembly in a reducing atmosphere. The particle diameter of the catalyst is generally not less than 1 nm and not more than 50 nm.

The structure of the composite composed of the oxidation-reduction catalyst and the proton-conductive oxide (hereinafter often referred to as "catalyst composite") may vary depending, for example, upon the type and amount of the material used, or the production process of the composite. An example of the structure is shown in FIG. 1. Specifically, the oxide B may be unevenly distributed on the surface of the catalyst carrier A (FIGS. 1(a) and (c)), or alternatively may be in the form of a layer formed so as to continuously cover the surface of the catalyst carrier A (FIGS. 1(b) and (d)). Further, the oxidation-reduction catalyst C may be supported on the surface of the catalyst carrier A directly or through a phase of the oxide particles B. In this case as well, the oxidation-reduction catalyst C may be unevenly distributed on the surface of the proton-conductive oxide (FIGS. 1(a) and (b)), or alternatively may be in the form of a layer formed so as to continuously cover the surface of the proton-conductive oxide (FIGS. 1(c) and (d)).

In the embodiment of the present invention, the fuel electrode and the oxidizer electrode each have a gas dispersive structure formed of a porous material or the like, and, for example, a fuel gas and a liquid fuel or an oxidizing agent gas can be passed through the structure. The electrode may be in a simple layer form formed by forming a catalyst layer containing the catalyst composite and a binder, or alternatively may be in an assembly form formed by forming a catalyst layer on other support. The electrode may be formed by any method without particular limitation. For example, the electrode may be formed by mixing and dispersing the catalyst composite and an organic polymer binder in water or an organic solvent such as an alcohol to prepare a slurry, coating this slurry on a support, and drying and firing the coating to form a catalyst layer. In this embodiment, the catalyst level of the electrode is not less than 0.01 mg/cm$^2$ and not more than 10 mg/cm$^2$. The catalyst composite is not less than 0.1 mg/cm$^2$ and not more than 50 mg/cm$^2$.

The support is not particularly limited. For example, a construction may be adopted in which an electrolyte membrane is provided as a support and a catalyst layer is formed on the electrolyte membrane to prepare a membrane electrode composite. Alternatively, a construction may be adopted in which a catalyst layer is formed, for example, on a gas-permeable or electron-conductive carbon paper, felt or cloth and the assembly is combined with an electrolyte membrane to prepare a membrane electrode composite.

An organic polymer binder should be used as a binder for fixing the catalyst composite onto the catalyst layer. The effect of smoothly promoting substance circulation within the catalyst layer, for example, the effect of removing gas evolved or water produced upon the supply of a fuel or oxidizing agent or upon power generation may be imparted to the organic polymer binder. The organic polymer binder is not particularly limited, and examples thereof include water-repellent organic polymers such as fluoropolymers and aromatic polymers. Specific examples thereof include polytetrafluoroethylene (PTFE), tetrafluoroethylene-hexafluoropropylene copolymer (FEP), tetrafluoroethylene-perfluoroalkyl vinyl ether copolymer (PFA), polystyrene (PS) or polyetherketone, polyetheretherketone (PEEK), polysulfone (PSF), polyethersulfone, polybenzimidazole (PBI), or other engineering plastic materials.

Further, polymer materials, which develop proton conductivity, may be used as the organic polymer binder. Specific examples thereof include materials prepared by doping sulfonic acid, phosphoric acid or other proton carrier into the above polymer material, materials prepared by chemically bonding and fixing the sulfonic acid, phosphoric acid or other proton carrier to the polymer material, or perfluorosulfonic acid.

The catalyst composite with the proton-conductive oxide or catalyst supported thereon functions as a proton conductor when water is present on the surface of the catalyst composite. The selection of a hydrophilic organic polymer as the organic polymer binder can realize the supply of a satisfactory amount of water to the catalyst composite and thus can realize a catalyst layer having a high level of proton conductivity. The hydrophilic organic polymer is preferably an organic polymer having an equilibrium moisture absorption rate of not less than 5% as measured at a temperature of 20° C. or above. Further, preferably, the hydrophilic polymer has in its structure any of a hydroxyl group, a carboxyl group, an ether bond, an amide bond and an ester bond. Specific examples of hydrophilic polymer materials include polyvinyl alcohol, polyacrylic acid, polyacrylic ester, polyvinyl pyrrolidone, polyethylene glycol, polyamide, polyester, and polyvinyl acetate. The equilibrium moisture absorption rate is determined by allowing a sample film to stand in a thermohygrostat regulated to a temperature of 20° C. or above and a relative humidity of not less than 95% for one week, measuring the weight of the sample film of which the moisture absorption rate is in an equilibrium state, and determining the difference between this weight and the weight of this sample after drying at 105° C. for 2 hr.

In the case of hydrocarbon organic polymer binders, when the decomposition temperature is taken into consideration, the heat treatment temperature in the catalyst layer formation is about 200° C. or below. Fluorine-type organic polymer binders having a high decomposition temperature, however, can withstand heating at 400° C. or below. The reason for this has not been fully elucidated yet but is believed to reside in that, when a hydrophilic organic polymer is selected as the organic polymer binder, upon heat treatment at 200° C. or below, for example, an oxidation reaction, a dehydration reaction, interaction through a hydrogen bond, and crystallization of the hydrophilic organic polymer take place between the catalyst composite and the hydrophilic organic polymer, contributing to the prevention of swelling or dissolution of the hydrophilic organic polymer. At least for polyvinyl alcohol, the results of an infrared spectroscopic (IR) analysis suggest that heat treatment at a temperature of 200° C. or below causes oxidation of hydrophilic hydroxyl groups in the polyvinyl alcohol with a solid superacid for conversion to hydrophobic ketone groups. The heat treatment should be carried out at such a temperature that does not cause decomposition or deterioration of the organic polymer, and the heat treatment at a temperature of 200° C. or below is preferred.

Since the formation of a catalyst layer structure of which the porosity is maintained while maintaining a high level of proton conductivity and electroconductivity is preferred, the mixing ratio of the organic polymer binder is preferably such that the weight ratio of the organic polymer binder ($W_P$) to the total weight of the catalyst layer ($W_{cat}$), i.e., $W_P/W_{cat}$, is in the range of 0.001 to 0.5. When the mixing ratio is in the above-defined range, the proton conductivity and electroconductivity can be improved because the continuity of the catalyst-supported catalyst composite can be enhanced.

The affinity of the organic polymer binder for water varies depending upon the structure of the organic polymer binder, and the water repellency and hydrophilicity of the catalyst layer or electrode may if necessary be varied. For example, hydrophobic silica comprising silicon oxide $SiO_2$ having a surface modified with trimethylsilyl groups (for example, RX200, manufactured by Nippon Aerosil Co., Ltd.) may be used as the water repellent material. On the other hand, for example, silicon oxide $SiO_2$, or titanium oxide $TiO_2$ which has been superhydrophilified by ultraviolet light irradiation, may be used as the hydrophilic material.

According to the embodiment described above, stable output can be realized over a temperature range of room temperature to an elevated temperature around 150° C., and, further, for example, proton conductivity and electroconductivity within the electrode can be enhanced.

Second Embodiment

The second embodiment of the present invention relates to a membrane electrode composite comprising a fuel electrode, an oxidizer electrode, and an electrolyte membrane disposed between the fuel electrode and the oxidizer electrode. At least one of the fuel electrode and the oxidizer electrode comprises a catalyst layer, and the construction and effect of the catalyst layer is the same as those described above in connection with the first embodiment.

The electrolyte membrane is not particularly limited, and examples thereof include perfluorosulfonic acid-containing polymer electrolyte membranes, for example, Nafion (tradename, manufactured by Du Pont). Since, however, stable output can be provided even under elevated temperatures, a proton-conductive solid electrolyte membrane comprising an oxide superacid contained in an organic polymer may be selected.

The oxide superacid contained in the organic polymer comprises an oxide carrier H containing at least one element M selected from the group consisting of titanium (Ti), zirconium (Zr), hafnium (Hf), niobium (Nb), aluminum (Al), gallium (Ga), indium (In), silicon (Si), germanium (Ge), tin (Sn) and cerium (Ce), oxide particles K supported on the surface of the oxide carrier H and containing at least one element N selected from the group consisting of tungsten (W), molybdenum (Mo), chromium (Cr), vanadium (V), and boron (B), and at least one element O contained in at least one of the oxide particles K and the oxide carrier H and selected from the group consisting of yttrium (Y), scandium (Sc), lanthanum (La), samarium (Sm), gadolinium (Gd), magnesium (Mg), calcium (Ca), strontium (Sr), and barium (Ba).

The exact mechanism of proton conduction in the oxide superacid has not been fully elucidated yet. However, it is believed that Lewis acid sites are produced within the structure of the oxide particles N by supporting the oxide particles containing an element N (such oxide particles being hereinafter referred to as "oxide particles K") on the surface of the oxide carrier containing an element M (hereinafter referred to as "oxide carrier H"), and the Lewis acid sites are hydrated to form Broensted acid sites, whereby the proton conduction field is formed. When the proton-conductive inorganic material has an amorphous structure, this structure is also considered to contribute to the promotion of Lewis acid site formation.

In addition of the Lewis acid site-derived proton production reaction, the number of molecules of accompanied water necessary for proton transfer can be reduced. Accordingly, a high level of proton conductivity can be realized by a small amount of water molecules present on the surface of the proton-conductive inorganic material. Accordingly, a high level of electric power generation can be realized without the necessity of strict water control during the power generation. Thus, the incorporation of the oxide superacid in the electrolyte membrane can lower the cell resistance of the fuel cell and can increases the maximum electric power generation of the fuel cell.

Further, the oxide superacid-containing electrolyte membrane can suppress the permeation of a liquid fuel such as methanol. In particular, the addition of a polymer material to the electrolyte membrane for enhancing the binding between the oxide superacid materials can further enhance the denseness of the proton-conductive electrolyte membrane, and thus can further suppress the permeation of the liquid fuel.

The oxide carrier H may be synthesized by any method without any particular limitation, for example, by a gas phase method wherein a gas containing the element M is decomposed to give an oxide, or by a sol-gel method using a metal alkoxide containing the element M as a starting material. Further, an oxide carrier H may be formed of a composite oxide containing a plurality of elements. Examples of oxides H containing the element M include $TiO_2$, $ZrO_2$, $HfO_2$, $Nb_2O_5$, $Al_2O_3$, $Ga_2O_3$, $In_2O_3$, $SiO_2$, $GeO_2$, $SnO_2$, and $CeO_2$. The use of $TiO_2$ is preferred from the viewpoint of realizing high proton conductivity while suppressing the production cost. Examples of shapes of oxide carriers H include, but are not limited to, particles, fibers, flat plates, layers, and pores.

Oxide particles K may be supported on the surface of the oxide carrier H, for example, by the following method. Specifically, the oxide carrier H is dispersed in a solution containing an element N-containing substance dissolved therein. The solvent contained in the solution is evaporated, and the substance containing element N present on the surface of the oxide carrier H is heat treated for conversion to oxide particles K to support the oxide particles K on the surface of the oxide carrier H. Examples of solutions containing element N-containing substance dissolved therein include aqueous chloride solutions, aqueous nitrate solutions, aqueous hydroacid salt solutions, aqueous oxoacid salt solutions, and alcohol solutions of metal alkoxides. The supporting method is not limited to this method only. Further, the oxide particles K may be formed of a composite oxide containing a plurality of elements.

The support of the oxide particles K on at least a part of the surface of the oxide carrier H suffices for contemplated results. For example, the oxide particles K may be unevenly distributed on the surface of the oxide carrier H. Alternatively, the oxide particles K may be a layer provided so as to continuously cover the surface of the oxide carrier H. The crystallinity of the oxide particles K and the oxide carrier H is not limited, and both the oxide particles K and the oxide carrier H may be crystalline. When the promotion of Lewis acid site formation, the possibility of contribution to an improvement in acidity, a reduction in production cost, and easiness in the production process are taken into consideration, preferably, both the oxide particles K and the oxide carrier H are amorphous. Further, it is also possible to adopt such a combination that the oxide particles K are crystalline while the oxide carrier H is amorphous. However, it is more preferred to adopt such a combination that the oxide particles K are amorphous while the oxide carrier H is crystalline.

The support of the oxide particles K on the oxide carrier H can be confirmed, for example, by X-ray diffractometry (XRD) in which a crystal lattice diffraction pattern inherent in a substance is obtained when the substance is a crystalline substance. Whether or not the crystalline supported material is present can be confirmed by comparing a diffraction pattern before the supporting with a diffraction pattern after the supporting. On the other hand, when the supported product is an amorphous substance, the presence of the amorphous substance cannot be confirmed from the diffraction pattern. In this case, however, the presence of the amorphous supported product can be confirmed by compositional analysis using equipment, for example, by atomic absorption spectroscopy. An energy dispersive X-ray spectroscopy (EDX), electron probe microanalysis (EPMA) or X-ray electron spectroscopy (XPS) can be used for the compositional analysis.

The solubility of the oxide particles K varies depending upon elements and pH environment. In some cases, however, the oxide particles K are soluble in water. Since, the oxide particles K are supported on low-water soluble oxide carrier H, the dissolution of the oxide particles K in water can be suppressed, contributing to enhanced stability of the oxide superacid against water and the liquid fuel. Further, the contamination of other fuel cell materials and apparatus with ions produced from eluted oxide particles K can be avoided. Accordingly, in fuel cells, long-term reliability can be realized. Further, the production cost of the cell can also be suppressed by using an inexpensive oxide carrier H as a base material.

The oxide superacid can be formed, for example, by supporting the oxide particles K on the surface of the oxide carrier H by firing. For some firing temperature, satisfactory acidity cannot be realized due to unsatisfactory bonding force. Further, in some cases, there is a possibility that, due to scattering of the constituent oxide, the contemplated composition cannot be provided resulting in reduced proton conduction field. Further, firing causes a change in crystal structure due to increased crystallinity of the oxide which in turn results in the development of stress on the oxide superacid. The stress developed in the oxide superacid lowers the bonding force between the oxide carrier H and the oxide particles K which possibly causes separation of the oxide carrier H from the oxide particles K. The separation between the oxide carrier H and the oxide particles K disadvantageously leads to lowered acidity and reduced proton conduction fields.

Preferably, an oxide L containing at least one element O selected from the group consisting of yttrium (Y), scandium (Sc), lanthanum (La), samarium (Sm), gadolinium (Gd), magnesium (Mg), calcium (Ca), strontium (Sr) and barium (Ba) is incorporated as a third component in the oxide superacid. This oxide L can function as a structure stabilizer for the proton-conducive inorganic material. Specific examples of the oxide L include $Y_2O_3$, $Sc_2O_3$, $La_2O_3$, $Sm_2O_3$, $Gd_2O_3$, MgO, CaO, SrO, and BaO. The oxide L may be incorporated in at least one of the oxide carrier H and the oxide particles K. From the viewpoint of realizing high output in fuel cells, the incorporation of an oxide L in the oxide carrier H is preferred.

The content of the element O in the oxide superacid is preferably in the range of 0.01 to 40% by mole when the total molar amount of the element M, element N, and element O is supposed to be 100% by mole. When the element O content is not less than 0.01% by mole, the stability of the oxide superacid can be improved. On the other hand, when the element O content is not more than 40% by mole, the solid superacidity of the oxide superacid can be maintained. The element O content is more preferably in the range of 0.1 to 10% by mole.

Preferably, the oxide superacid has solid superacidity. The degree of proton dissociation can be represented by the degree of acidity, and the degree of acidity of a solid acid can be represented by the Hammett acidity function $H_0$. In the case of 100% sulfuric acid, the $H_0$ value is −11.93 (theoretical value). More preferably, the oxide superacid has a solid superacidity of $H_0 < -11.93$. The optimization of the synthetic method can enhance the acidity to an acidity function $H_0$ of −20.00. Accordingly, the acid strength of the oxide superacid may be brought to $-20.00 \leq H_0 < -11.93$. As will be described later in working examples, the solid superacidity of the oxide superacid can be determined indirectly by measuring the solid superacidity of a film containing the oxide superacid.

As described above, since the surface of the oxide superacid functions as a proton conduction field, the specific surface area of the oxide superacid is preferably as large as possible. From the viewpoints of facilitating the handleability and easily realizing even control of the synthesis, the specific surface area of the oxide superacid is preferably not more than 2000 m$^2$/g. Further, from the viewpoint of providing satisfactory proton conductivity, the specific surface area is preferably not less than 10 m$^2$/g. Accordingly, the specific surface area is preferably in the range of 10 to 2000 m$^2$/g.

The ratio of the number of moles $M_N$ of the element N in the oxide particles K to the number of moles $M_M$ of the element M in the oxide carrier H, that is, $M_N/M_M$, is preferably in the range of 0.0001 to 20. The molar ratio ($M_N/M_M$) is preferably not less than 0.0001 from the viewpoint of ensuring satisfactory support level and satisfactorily maintaining the proton conduction field to enhance the proton conductivity. On the other hand, from the viewpoint of preventing a lowering in proton conductivity as a result of concealing the proton conduction field with the element N-containing oxide particles K due to excessive support level, the molar ratio ($M_N/M_M$) is preferably not more than 20. The molar ratio ($M_N/M_M$) is more preferably in the range of 0.01 to 1.

The oxide superacid may be produced, for example, by supporting a precursor of the oxide particles K on the oxide carrier H and then heat treating the assembly in an oxidizing atmosphere such as the air. The heat treatment temperature is preferably 200° C. or above from the viewpoint of satisfactorily forming chemical bonds between the oxide carrier H and the oxide particles K and enhancing the proton conductivity of the resultant oxide superacid. On the other hand, from the viewpoint of preventing a lowering in proton conductivity attributable to a reduction in specific surface area due to fusion between the particles, the treatment temperature is preferably 1000° C. or below. Accordingly, the heat treatment temperature is preferably 200 to 1000° C. At a low temperature of 200° C., the heat treatment should be carried out for a relatively long period of time sufficient for forming a bond between the oxide carrier H and the oxide particles K. On the other hand, when the heat treatment temperature is an elevated temperature around 1000° C., since a bond is easily formed, the contemplated synthesis can be realized by the heat treatment for a short period of time. Accordingly, the heat treatment temperature is further preferably 400 to 700° C.

The organic polymer is not particularly limited, and examples thereof include water-repellent organic polymers such as fluoropolymers and aromatic polymers. Specific examples thereof include polytetrafluoroethylene (PTFE), tetrafluoroethylene-hexafluoropropylene copolymer (FEP), tetrafluoroethylene-perfluoroalkyl vinyl ether copolymer (PFA), polystyrene (PS) or polyetherketone, polyetheretherketone (PEEK), polysulfone (PSF), polyethersulfone, polybenzimidazole (PBI), or other engineering plastic materials. Among others, polyacrylonitrile (PAN) is preferred because of its high polarity.

Further, polymer materials, which develop proton conductivity, may be used as the organic polymer. Specific examples thereof include materials prepared by doping sulfonic acid, phosphoric acid or other proton carrier into the above polymer material, materials prepared by chemically bonding and fixing the sulfonic acid, phosphoric acid or other proton carrier to the polymer material, or perfluorosulfonic acid.

The oxide superacid, when water is present on its surface, functions as a proton conductor. The selection of a hydrophilic organic polymer as the oxide superacid-containing polymer can realize the supply of a satisfactory amount of water to the oxide superacid and thus can realize a proton-conductive solid electrolyte having high proton conductivity. The hydrophilic organic polymer is preferably an organic polymer which has an equilibrium moisture absorption rate of not less than 5% as measured at a temperature of 20° C. or above and, for example, has in its polymeric structure any of a hydroxyl group, a carboxyl group, an ether bond, an amide bond and an ester bond. Specific examples of hydrophilic polymer materials include polyvinyl alcohol, polyacrylic acid, polyacrylic ester, polyvinyl pyrrolidone, polyethylene glycol, polyamide, polyester, and polyvinyl acetate. The equilibrium moisture absorption rate is determined by allowing a sample film to stand in a thermohygrostat regulated to a temperature of 20° C. or above and a relative humidity of not less than 95% for one week, measuring the weight of the sample film of which the moisture absorption rate is in an equilibrium state, and determining the difference between this weight and the weight of this sample after drying at 105° C. for 2 hr. In the proton-conductive solid electrolyte membrane, the mixing ratio between the oxide superacid and the organic polymer is a value satisfying the requirement that the permeation of the liquid fuel can be prevented while maintaining high proton conductivity. When the weight ratio of the proton-conductive inorganic oxide ($W_S$) to the total weight of the membrane ($W_T$), that is, $W_S/W_T$, is smaller than 0.1, there is a possibility that the continuity of the proton-conductive inorganic oxide is lowered resulting in lowered conductivity. Accordingly, the weight ratio ($W_S/W_T$) is preferably in the range of not less than 0.1 and not more than 0.999.

The proton-conductive solid electrolyte is prepared by dissolving an oxide superacid and an organic polymer in a solvent to prepare a slurry formed of an organic polymer solution, casting the slurry onto a glass substrate or a resin substrate, drying the coating to remove the solvent, and then heat treating the dried coating. In the case of hydrocarbon-type organic polymers, the heat treatment temperature is about 200° C. or below when the decomposition temperature is taken into consideration. For example, fluorine-type organic polymers having a high decomposition temperature, however, can withstand heating at 400° C. or below. The reason for this has not been fully elucidated yet but is believed to reside in that, when a hydrophilic organic polymer is selected as the material for the electrolyte membrane, upon heat treatment at 200° C. or below, for example, an oxidation reaction, a dehydration reaction, interaction through a hydrogen bond, and crystallization of the hydrophilic organic polymer take place between the oxide superacid and the hydrophilic organic polymer, contributing to the prevention of swelling or dissolution of the hydrophilic organic polymer. At least for polyvinyl alcohol, the results of an infrared spectroscopic (IR) analysis suggest that heat treatment at a temperature of 200° C. or below causes oxidation of hydrophilic hydroxyl groups in the polyvinyl alcohol with a solid superacid for conversion to hydrophobic ketone groups.

The heat treatment should be carried out at such a temperature that does not cause decomposition or deterioration of the organic polymer, and the heat treatment at a temperature of 200° C. or below is preferred.

The proton-conductive solid electrolyte, when used as the solid electrolyte of the fuel cell, is generally used as a membrane. The form of the proton-conductive solid electrolyte, however, is not limited to the membrane only and may also be cylindrical. Specifically, methods usable herein include one in which a dispersion mixture of the oxide superacid and the hydrophilic organic polymer is cast directly to a membrane form, or one in which the dispersion mixture is impregnation cast, for example, onto a porous core material, a woven fabric, or a nonwoven fabric.

The thickness of the proton-conductive solid electrolyte membrane is not particularly limited but is preferably not less than 10 μm from the viewpoint of providing a membrane that can withstand practical use, for example, in terms of strength, permeation of the liquid fuel, and proton conductivity and is preferably not more than 300 μm for membrane resistance reduction purposes. In particular, the thickness of the proton-conductive solid electrolyte membrane is more preferably 10 to 100 μm from the viewpoint of reducing the internal resistance of the fuel cell.

The thickness of the membrane can be regulated by any method without particular limitation. For example, when a dispersion mixture of the oxide superacid and the organic polymer is cast directly to a membrane, the membrane thickness may be varied by the amount of the dispersion mixture of the oxide superacid and the organic polymer cast, or the cast area. Alternatively, after the membrane formation, the membrane may be heated and pressed by a hot pressing machine or the like to reduce the membrane thickness.

The junction between the electrolyte membrane and the electrode may be carried out with an apparatus which can conduct heating and pressing. In general, the junction operation is carried out with a hot press. In this case, the pressing may be carried out at or above the glass transition temperature of the polymer used in the electrolyte membrane, and the pressing temperature is generally 100° C. or above and 400° C. or below. The pressing pressure depends upon the hardness of the electrode used but is generally 5 kg/cm$^2$ to 200 kg/cm$^2$.

According to the membrane electrode composite in this embodiment, stable output can be realized even over a temperature range of room temperature to an elevated temperature around 150° C., and, further, the proton conductivity and electron conductivity within the electrode can be enhanced. In particular, the use of the oxide superacid in the fuel electrode, electrolyte membrane and oxidizer electrode can realize rapid movement of protons and electrons.

Third Embodiment

The fuel cell in the third embodiment comprises the membrane electrode composite in the second embodiment.

Figure 2:
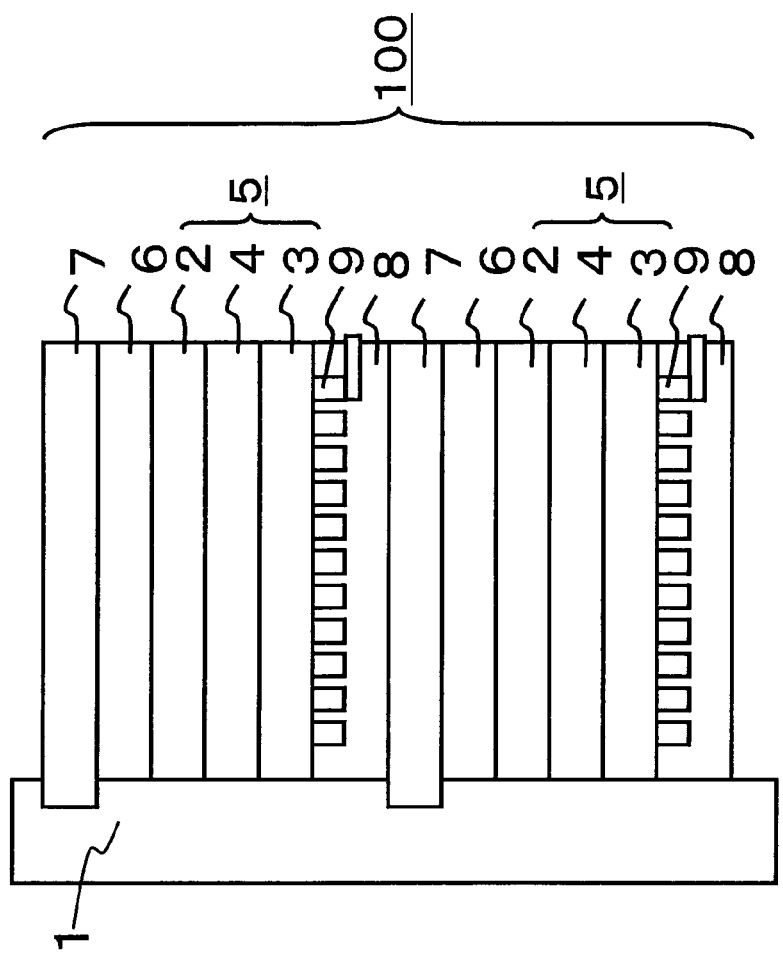
FIG. 2 is a typical cross-sectional view of a liquid fuel cell in one embodiment of the fuel cell according to the present invention.

The fuel cell in the third embodiment will be described with reference to the accompanying drawings. FIG. 2 is a typical cross-sectional view of a fuel cell in the third embodiment of the present invention.

A stack 100 of a liquid fuel cell shown in FIG. 2 is formed by stacking a plurality of unit cells on top of each other. A fuel introduction path 1 is disposed on the side face of the stack 100. A liquid fuel is supplied into the fuel introduction path 1 from a liquid fuel tank (not shown) through an introduction pipe (not shown). The liquid fuel preferably contains methanol. For example, an aqueous methanol solution or methanol can be used as the liquid fuel. Each unit cell comprises a membrane electrode composition (electrogenic part) 5 comprising a fuel electrode (also known as an anode) 2, an oxidizer electrode (also known as a cathode) 3, and an electrolyte membrane 4 provided between the fuel electrode 2 and the oxidizer electrode 3. The fuel electrode 2 and the oxidizer electrode 3 are preferably formed of an electroconductive porous material so as to be permeable to a fuel and an oxidizing agent gas and, further, permeable to electrons.

Each unit cell further comprises a fuel vaporization part 6 stacked onto the fuel electrode 2, a fuel permeation part 7 stacked on the fuel vaporization part 6, and a cathode separator 8 stacked on the oxidizer electrode 3. The fuel permeation part 7 functions to hold the liquid fuel. This liquid fuel is supplied through the fuel introduction path 1. This fuel vaporization part 6 functions to lead the vaporizable component in the liquid fuel held in the fuel permeation part 7 to the fuel electrode 2. Oxidizing agent gas supply grooves 9 are provided as continuous grooves for oxidizing agent gas flowing purposes on the cathode separator 8 in its side facing the oxidizer electrode 3. Further, the cathode separator 8 also functions to connect adjacent electrogenic parts 5 to each other in series.

As shown in FIG. 2, when unit cells are stacked on top of each other to constitute the stack 100, the separator 8, the fuel permeation part 7 and the fuel vaporization part 6 also function as a current collector for conducting the generated electrons and thus are preferably formed of an electroconductive material such as a carbon-containing porous material.

As described above, the separator 8 in the unit cells shown in FIG. 2 functions also as an oxidizing agent gas flow channel. Thus, the number of components can be reduced by using a component 8 which functions both as a separator and a channel (hereinafter referred to as "channel/separator"). Accordingly, a further reduction in size of the fuel cell can be realized. Alternatively, an ordinary channel can be used instead of the separator 8.

The liquid fuel may be supplied from a fuel storage tank (not shown) into the liquid fuel introduction path 1, for example, by a method in which the liquid fuel contained in the fuel storage tank is freely fallen down and is introduced into the liquid fuel introduction path 1. This method has such a structural restriction that the fuel storage tank should be provided at a position above the upper surface of the stack 100, but on the other hand, the liquid fuel can be reliably introduced into the liquid fuel introduction path 1. Another example of the method for supplying the liquid fuel is a method in which the liquid fuel is drawn from the fuel storage tank by taking advantage of the capillary force of the liquid fuel introduction part 1. When this method is adopted, there is no need to render the position of the point of connection between the fuel storage tank and the liquid fuel introduction path 1, that is, the position of the fuel inlet provided in the liquid fuel introduction path 1, above the upper surface of the stack 100. Accordingly, for example, a combination of this method with the free falling method is advantageous in that the installation place of the fuel tank can be freely set.

In order to continuously smoothly supply the liquid fuel, introduced into the liquid fuel introduction path 1 through the capillary force into the fuel permeation part 7, preferably, the capillary force into the fuel permeation part 7 is set so as to be larger than the capillary force in the liquid fuel introduction path 1. The number of the liquid fuel introduction path 1 is not limited to one along the side face of the stack 100, and the liquid fuel introduction path 1 can also be formed on the other side face of the stack.

The fuel storage tank may be detachable from the cell body. The replacement of the fuel storage tank can realize continuous operation of the cell for a long period of time. The liquid fuel can be supplied from the fuel storage tank into the liquid fuel introduction path 1 by a method in which the liquid fuel is pushed out, for example, by free falling or internal pressure within the tank, or by withdrawing the fuel through the capillary force of the liquid fuel introduction path 1.

The liquid fuel introduced into the liquid fuel introduction path 1 by the above method is supplied to the fuel permeation part 7. The form of the fuel permeation part 7 is not particularly limited so far as the fuel permeation part 7 has such a function that the fuel permeation part 7 holds the liquid fuel in its interior and only the vaporized fuel is supplied through the fuel vaporization part 6 to the fuel electrode 2. For example, the fuel permeation part 7 may have such a construction that a passage for the liquid fuel is provided, and a gas-liquid separating membrane is provided at the interface of the liquid fuel permeation part 7 and the fuel vaporization part 6. When the liquid fuel is supplied into the fuel permeation part 7 through the capillary force without using any auxiliary machine, the form of the fuel permeation part 7 is not particularly limited so far as the liquid fuel can be permeated into the fuel permeation part 7 through the capillary force, and examples thereof include porous materials formed of particles or fillers, nonwoven fabrics manufactured by a papermaking method, woven fabrics prepared by weaving fibers, and further narrow gaps formed with a plate of glass, plastic or the like.

Here a case where a porous material is used as the fuel permeation part 7 will be described. At the outset, capillary force of the porous material per se constituting the fuel permeation part 7 may be mentioned as the capillary force for drawing the liquid fuel to the fuel permeation part 7 side. When the capillary force is utilized, the liquid fuel can be smoothly supplied in the lateral direction through the capillary force by regulating the diameter of interconnected pores of the porous fuel permeation part 7 as the so-called continuous pores and, further, providing continuous pores continued from the side face of the fuel permeation part 7 on the liquid fuel introduction part 1 side to at least the other face.

For example, the pore diameter of the porous material used as the fuel permeation part 7 is not particularly limited so far as the liquid fuel in the liquid fuel introduction path 1 is drawn into the porous material. When the capillary force of the liquid fuel introduction path 1 is taken into consideration, however, the pore diameter of the porous material is preferably about 0.01 to 150 μm. The volume of the pores as an index of the continuity of the pores in the porous material is preferably about 20 to 90%. The pore diameter is preferably not less than 0.01 μm from the viewpoint of facilitating the formation of the fuel permeation part 7. On the other hand, from the viewpoint of satisfactorily maintaining the capillary force, the pore diameter is preferably not more than 150 μm. Further, in order to prevent such a phenomenon that the capillary force is lowered due to an increase in the amount of closed pores as a result of a reduction in continuous pores, the pore volume is preferably not less than 20%. On the other hand, in order to facilitate the formation of the fuel permeation part 7 by preventing such a phenomenon that the amount of continuous pores is excessively increased resulting in weakened strength, the pore volume is preferably not more than 90%. From the practical viewpoint, the porous material constituting the fuel permeation part 7 has a pore diameter in the range of 0.5 to 100 μm, and the pore volume is preferably in the range of 30 to 75%.

In the fuel cell, a cell reaction takes place at room temperature. The operation at an elevated temperature of 50° C. to 150° C., however, is preferred, because the catalytic activity of the electrode can be improved to reduce the overvoltage of the electrode. Further, in order to develop a satisfactory proton conduction ability of the catalyst carrier having proton conductivity of the electrode catalyst layer, the operation at such a temperature that can realize easy water control is preferred. The operation temperature of the fuel cell is preferably in the range of room temperature to 150° C.

EXAMPLES

Embodiments of the present invention will be further described by the following Examples which are specific but not limitative of the present invention.

Example 1

An ethanol solution containing 1 g of tin tetrachloride pentahydrate $SnCl_4.5H_2O$ and 19.6 g of indium nitrate trihydrate $In(NO_3).3H_2O$ dissolved therein was prepared. The ethanol solution was sprayed on a glass substrate heated to 350° C. to oxidize and thermally decompose the starting material and thus to give Tin(Sn)-doped $In_2O_3$. Further, Sn-doped $In_2O_3$ was recovered from the glass substrate and was ground to prepare a catalyst carrier. The level of Sn doped into $In_2O_3$ was 5% by mole.

The catalyst carrier prepared in the above step was dispersed in 50 ml of an ethanol solution containing 0.7 g of trimethoxyborane $B(OCH_3)_3$ dissolved therein, and the dispersion was hydrolyzed. The solvent was then removed, and the resultant precursor was heat treated at 350° C. for 4 hr to give a proton-conductive inorganic oxide comprising boron oxide supported on the catalyst carrier. The ratio of boron (B) element to tin (Sn) element and indium (In) element in Sn-doped $In_2O_3$ was 0.1.

The proton-conductive inorganic oxide synthesized in the above step was dispersed in 500 mL of water. A 0.1 mol/L aqueous solution of chloroplatinic acid $H_2PtCl_6$, a 0.1 mol/L aqueous solution of chlororuthenic acid $H_2RuCl_5$, and a 0.1 mol/L aqueous solution of sodium hydrogencarbonate $NaHCO_3$ were simultaneously added dropwise to the dispersion. The mixture was adjusted to pH 7 to 8. The resultant solid matter was collected by filtration and was dried to give a proton-conductive inorganic oxide with a PtRu catalyst precursor supported thereon. The proton-conductive inorganic oxide thus obtained was reduced at 200° C. in hydrogen to give a PtRu catalyst. In this case, the level of PtRu was 10% based on the total weight.

Likewise, the proton-conductive inorganic oxide synthesized in the above step was dispersed in 500 mL of water. A 0.1 mol/L aqueous solution of chloroplatinic acid $H_2PtCl_6$ and a 0.1 mol/L aqueous solution of sodium hydrogencarbonate $NaHCO_3$ were simultaneously added dropwise to the dispersion. The mixture was adjusted to pH 7 to 8, and the resultant solid matter was collected by filtration and dried to give a proton-conductive inorganic oxide with a Pt catalyst precursor supported thereon. The proton-conductive inorganic oxide was reduced in hydrogen at 200° C. to give a Pt catalyst. In this case, the level of Pt was 10% based on the total weight.

Thereafter, 0.5 g of the proton-conductive inorganic oxide with PtRu supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare an anode catalyst slurry. This slurry was coated onto a carbon paper, and the coated carbon paper was dried at 60° C. for one hr. The electrode thus obtained was fired at 150° C. for one hr to prepare an anode. The anode was formed of a 50 μm-thick catalyst layer and had a Pt catalyst level of 4.2 mg/cm$^2$.

Thereafter, 0.5 g of the proton-conductive inorganic oxide with Pt supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare a cathode catalyst slurry. This slurry was coated onto a carbon paper, and the coated carbon paper was dried at 60° C. for one hr. The electrode thus obtained was fired at 150° C. for one hr to prepare a cathode. The cathode was formed of a 50 μm-thick catalyst layer and had a Pt catalyst level of 4.3 mg/cm$^2$.

The element ratio of the catalyst carrier and the element ratio of the proton-conductive inorganic oxide were measured by an energy dispersive X-ray analysis (EDX), an X-ray electron spectroscopy (XPS), and an inductive coupling plasma emission analysis (ICP).

Example 2

An ethanol solution containing 1 g of tin tetrachloride pentahydrate $SnCl_4.5H_2O$ and 19.6 g of indium nitrate trihydrate $In(NO_3).3H_2O$ dissolved therein was prepared. The ethanol solution was sprayed on a glass substrate heated to 350° C. to oxidize and thermally decompose the starting material and thus to give Tin(Sn)-doped $In_2O_3$. Further, Sn-doped $In_2O_3$ was recovered from the glass substrate and was ground to prepare a catalyst carrier. The level of Sn doped into $In_2O_3$ was 5% by mole.

The catalyst carrier prepared in the above step was dispersed in 50 ml of an ethanol solution containing 1 g of vanadium chloride $VCl_3$ dissolved therein, and the dispersion was hydrolyzed. The solvent was then removed, and the resultant precursor was heat treated at 350° C. for 4 hr to give a proton-conductive inorganic oxide comprising vanadium oxide supported on the catalyst carrier. The ratio of vanadium (V) element to tin (Sn) element and indium (In) element in Sn-doped $In_2O_3$ was 0.1.

The proton-conductive inorganic oxide synthesized in the above step was dispersed in 500 mL of water. A 0.1 mol/L aqueous solution of chloroplatinic acid $H_2PtCl_6$, a 0.1 mol/L aqueous solution of chlororuthenic acid $H_2RuCl_5$, and a 0.1 mol/L aqueous solution of sodium hydrogencarbonate $NaHCO_3$ were simultaneously added dropwise to the dispersion. The mixture was adjusted to pH 7 to 8. The resultant solid matter was collected by filtration and was dried to give a proton-conductive inorganic oxide with a PtRu catalyst precursor supported thereon. The proton-conductive inorganic oxide thus obtained was reduced at 200° C. in hydrogen to give a PtRu catalyst. In this case, the level of PtRu was 11% based on the total weight.

Likewise, the proton-conductive inorganic oxide synthesized in the above step was dispersed in 500 mL of water. A 0.1 mol/L aqueous solution of chloroplatinic acid $H_2PtCl_6$ and a 0.1 mol/L aqueous solution of sodium hydrogencarbonate $NaHCO_3$ were simultaneously added dropwise to the dispersion. The mixture was adjusted to pH 7 to 8, and the resultant solid matter was collected by filtration and dried to give a proton-conductive inorganic oxide with a Pt catalyst precursor supported thereon. The proton-conductive inorganic oxide was reduced in hydrogen at 200° C. to give a Pt catalyst. In this case, the level of Pt was 10% based on the total weight.

Thereafter, 0.5 g of the proton-conductive inorganic oxide with PtRu supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare an anode catalyst slurry. This slurry was coated onto a carbon paper, and the coated carbon paper was dried at 60° C. for one hr. The electrode thus obtained was fired at 150° C. for one hr to prepare an anode. The anode was formed of a 51 μm-thick catalyst layer and had a Pt catalyst level of 4.1 mg/cm².

Thereafter, 0.5 g of the proton-conductive inorganic oxide with Pt supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare a cathode catalyst slurry. This slurry was coated onto a carbon paper, and the coated carbon paper was dried at 60° C. for one hr. The electrode thus obtained was fired at 150° C. for one hr to prepare a cathode. The cathode was formed of a 52 μm-thick catalyst layer and had a Pt catalyst level of 4.2 mg/cm².

Example 3

An ethanol solution containing 1 g of tin tetrachloride pentahydrate $SnCl_4.5H_2O$ and 19.6 g of indium nitrate trihydrate $In(NO_3).3H_2O$ dissolved therein was prepared. The ethanol solution was sprayed on a glass substrate heated to 350° C. to oxidize and thermally decompose the starting material and thus to give Tin(Sn)-doped $In_2O_3$. Further, Sn-doped $In_2O_3$ was recovered from the glass substrate and was ground to prepare a catalyst carrier. The level of Sn doped into $In_2O_3$ was 5% by mole.

The catalyst carrier prepared in the above step was dispersed in 50 ml of an ethanol solution containing 1.7 g of chromium chloride hexahydrate dissolved therein, and the dispersion was hydrolyzed. The solvent was then removed, and the resultant precursor was heat treated at 350° C. for 4 hr to give a proton-conductive inorganic oxide comprising chromium oxide supported on the catalyst carrier. The ratio of chromium (Cr) element to tin (Sn) element and indium (In) element in Sn-doped $In_2O_3$ was 0.1.

The proton-conductive inorganic oxide synthesized in the above step was dispersed in 500 mL of water. A 0.1 mol/L aqueous solution of chloroplatinic acid $H_2PtCl_6$, a 0.1 mol/L aqueous solution of chlororuthenic acid $H_2RuCl_5$, and a 0.1 mol/L aqueous solution of sodium hydrogencarbonate $NaHCO_3$ were simultaneously added dropwise to the dispersion. The mixture was adjusted to pH 7 to 8. The resultant solid matter was collected by filtration and was dried to give a proton-conductive inorganic oxide with a PtRu catalyst precursor supported thereon. The proton-conductive inorganic oxide thus obtained was reduced at 200° C. in hydrogen to give a PtRu catalyst. In this case, the level of PtRu was 10% based on the total weight.

Likewise, the proton-conductive inorganic oxide synthesized in the above step was dispersed in 500 mL of water. A 0.1 mol/L aqueous solution of chloroplatinic acid $H_2PtCl_6$ and a 0.1 mol/L aqueous solution of sodium hydrogencarbonate $NaHCO_3$ were simultaneously added dropwise to the dispersion. The mixture was adjusted to pH 7 to 8, and the resultant solid matter was collected by filtration and dried to give a proton-conductive inorganic oxide with a Pt catalyst precursor supported thereon. The proton-conductive inorganic oxide was reduced in hydrogen at 200° C. to give a Pt catalyst. In this case, the level of Pt was 11% based on the total weight.

Thereafter, 0.5 g of the proton-conductive inorganic oxide with PtRu supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare an anode catalyst slurry. This slurry was coated onto a carbon paper, and the coated carbon paper was dried at 60° C. for one hr. The electrode thus obtained was fired at 150° C. for one hr to prepare an anode. The anode was formed of a 53 μm-thick catalyst layer and had a Pt catalyst level of 4.5 mg/cm².

Thereafter, 0.5 g of the proton-conductive inorganic oxide with Pt supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare a cathode catalyst slurry. This slurry was coated onto a carbon paper, and the coated carbon paper was dried at 60° C. for one hr. The electrode thus obtained was fired at 150° C. for one hr to prepare a cathode. The cathode was formed of a 51 μm-thick catalyst layer and had a Pt catalyst level of 4.4 mg/cm$^2$.

Example 4

An ethanol solution containing 1 g of tin tetrachloride pentahydrate $SnCl_4.5H_2O$ and 19.6 g of indium nitrate trihydrate $In(NO_3).3H_2O$ dissolved therein was prepared. The ethanol solution was sprayed on a glass substrate heated to 350° C. to oxidize and thermally decompose the starting material and thus to give Tin(Sn)-doped $In_2O_3$. Further, Sn-doped $In_2O_3$ was recovered from the glass substrate and was ground to prepare a catalyst carrier. The level of Sn doped into $In_2O_3$ was 5% by mole.

The catalyst carrier prepared in the above step was dispersed in 50 ml of an ethanol solution containing 1.1 g of hexaammonium heptamolybdate tetrahydrate $(NH4)_6 Mo_7O_{24}.4H_2O$ dissolved therein, and the dispersion was hydrolyzed. The solvent was then removed, and the resultant precursor was heat treated at 350° C. for 4 hr to give a proton-conductive inorganic oxide comprising molybdenum oxide supported on the catalyst carrier. The ratio of molybdenum (Mo) element to tin (Sn) element and indium (In) element in Sn-doped $In_2O_3$ was 0.1.

The proton-conductive inorganic oxide synthesized in the above step was dispersed in 500 mL of water. A 0.1 mol/L aqueous solution of chloroplatinic acid $H_2PtCl_6$, a 0.1 mol/L aqueous solution of chlororuthenic acid $H_2RuCl_5$, and a 0.1 mol/L aqueous solution of sodium hydrogencarbonate $NaHCO_3$ were simultaneously added dropwise to the dispersion. The mixture was adjusted to pH 7 to 8. The resultant solid matter was collected by filtration and was dried to give a proton-conductive inorganic oxide with a PtRu catalyst precursor supported thereon. The proton-conductive inorganic oxide thus obtained was reduced at 200° C. in hydrogen to give a PtRu catalyst. In this case, the level of PtRu was 12% based on the total weight.

Likewise, the proton-conductive inorganic oxide synthesized in the above step was dispersed in 500 mL of water. A 0.1 mol/L aqueous solution of chloroplatinic acid $H_2PtCl_6$ and a 0.1 mol/L aqueous solution of sodium hydrogencarbonate $NaHCO_3$ were simultaneously added dropwise to the dispersion. The mixture was adjusted to pH 7 to 8, and the resultant solid matter was collected by filtration and dried to give a proton-conductive inorganic oxide with a Pt catalyst precursor supported thereon. The proton-conductive inorganic oxide was reduced in hydrogen at 200° C. to give a Pt catalyst. In this case, the level of Pt was 12% based on the total weight.

Thereafter, 0.5 g of the proton-conductive inorganic oxide with PtRu supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare an anode catalyst slurry. This slurry was coated onto a carbon paper, and the coated carbon paper was dried at 60° C. for one hr. The electrode thus obtained was fired at 150° C. for one hr to prepare an anode. The anode was formed of a 51 μm-thick catalyst layer and had a Pt catalyst level of 4.3 mg/cm$^2$.

Thereafter, 0.5 g of the proton-conductive inorganic oxide with Pt supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare a cathode catalyst slurry. This slurry was coated onto a carbon paper, and the coated carbon paper was dried at 60° C. for one hr. The electrode thus obtained was fired at 150° C. for one hr to prepare a cathode. The cathode was formed of a 50 μm-thick catalyst layer and had a Pt catalyst level of 4.3 mg/cm$^2$.

Example 5

An ethanol solution containing 1 g of tin tetrachloride pentahydrate $SnCl_4.5H_2O$ and 19.6 g of indium nitrate trihydrate $In(NO_3).3H_2O$ dissolved therein was prepared. The ethanol solution was sprayed on a glass substrate heated to 350° C. to oxidize and thermally decompose the starting material and thus to give Tin(Sn)-doped $In_2O_3$. Further, Sn-doped $In_2O_3$ was recovered from the glass substrate and was ground to prepare a catalyst carrier. The level of Sn doped into $In_2O_3$ was 5% by mole.

The catalyst carrier prepared in the above step was dispersed in 50 ml of an ethanol solution containing 2.5 g of tungsten chloride $WCl_6$ dissolved therein, and the dispersion was hydrolyzed. The solvent was then removed, and the resultant precursor was heat treated at 350° C. for 4 hr to give a proton-conductive inorganic oxide comprising tungsten oxide supported on the catalyst carrier. The ratio of tungsten (W) element to tin (Sn) element and indium (In) element in Sn-doped $In_2O_3$ was 0.1.

The proton-conductive inorganic oxide synthesized in the above step was dispersed in 500 mL of water. A 0.1 mol/L aqueous solution of chloroplatinic acid $H_2PtCl_6$, a 0.1 mol/L aqueous solution of chlororuthenic acid $H_2RuCl_5$, and a 0.1 mol/L aqueous solution of sodium hydrogencarbonate $NaHCO_3$ were simultaneously added dropwise to the dispersion. The mixture was adjusted to pH 7 to 8. The resultant solid matter was collected by filtration and was dried to give a proton-conductive inorganic oxide with a PtRu catalyst precursor supported thereon. The proton-conductive inorganic oxide thus obtained was reduced at 200° C. in hydrogen to give a PtRu catalyst. In this case, the level of PtRu was 10% based on the total weight.

Likewise, the proton-conductive inorganic oxide synthesized in the above step was dispersed in 500 mL of water. A 0.1 mol/L aqueous solution of chloroplatinic acid $H_2PtCl_6$ and a 0.1 mol/L aqueous solution of sodium hydrogencarbonate $NaHCO_3$ were simultaneously added dropwise to the dispersion. The mixture was adjusted to pH 7 to 8, and the resultant solid matter was collected by filtration and dried to give a proton-conductive inorganic oxide with a Pt catalyst precursor supported thereon. The proton-conductive inorganic oxide was reduced in hydrogen at 200° C. to give a Pt catalyst. In this case, the level of Pt was 10% based on the total weight.

Thereafter, 0.5 g of the proton-conductive inorganic oxide with PtRu supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare an anode catalyst slurry. This slurry was coated onto a carbon paper, and the coated carbon paper was dried at 60° C. for one hr. The electrode thus obtained was fired at 150° C. for one hr to prepare an anode. The anode was formed of a 50 μm-thick catalyst layer and had a Pt catalyst level of 4.1 mg/cm$^2$.

Thereafter, 0.5 g of the proton-conductive inorganic oxide with Pt supported thereon was mixed with 0.5 g of carbon, 1 g of a 5% aqueous polyvinyl alcohol solution, 1 g of water, and 1 g of ethanol. The mixture, together with zirconia balls, was transferred to a hermetically sealed vessel, followed by mixing in a bench ball mill for 6 hr to prepare a cathode catalyst slurry. This slurry was coated onto a carbon paper, and the coated carbon paper was dried at 60° C. for one hr. The electrode thus obtained was fired at 150° C. for one hr to prepare a cathode. The cathode was formed of a 52 μm-thick catalyst layer and had a Pt catalyst level of 4.3 mg/cm$^2$.

Example 6

A catalyst carrier of F-doped $SnO_2$, in which the level of F (fluorine) doped was 5% by mole, was prepared in the same manner as in Example 1, except that tin tetrachloride pentahydrate $SnCl_4.5H_2O$ was changed to 0.11 g of ammonium fluoride $NH_4F$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising boron oxide supported on the surface of the catalyst carrier was provided. In this case, the ratio of boron (B) element to fluorine (F) element and tin (Sn) element in F-doped $SnO_2$ was 0.1. Further, a PtRu catalyst and a Pt catalyst were supported on the surface of the proton-conductive inorganic oxide. In this case, the level of PtRu was 10% based on the total weight, and the level of Pt was 13% based on the total weight.

An anode and a cathode were prepared in the same manner as in Example 1, except that this proton-conductive inorganic oxide with the catalyst supported thereon was used. The anode was formed of a 52 μm-thick catalyst layer and had a Pt catalyst level of 4.1 mg/cm$^2$. On the other hand, the cathode was formed of a 53 μm-thick catalyst layer and had a Pt catalyst level of 4.4 mg/cm$^2$.

Example 7

A catalyst carrier of F-doped $SnO_2$, in which the level of F (fluorine) doped was 5% by mole, was prepared in the same manner as in Example 2, except that tin tetrachloride pentahydrate $SnCl_4.5H_2O$ was changed to 0.11 g of ammonium fluoride $NH_4F$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising vanadium oxide supported on the surface of the catalyst carrier was provided. In this case, the ratio of vanadium (V) element to fluorine (F) element and tin (Sn) element in F-doped $SnO_2$ was 0.1. Further, a PtRu catalyst and a Pt catalyst were supported on the surface of the proton-conductive inorganic oxide. In this case, the level of PtRu was 12% based on the total weight, and the level of Pt was 14% based on the total weight.

An anode and a cathode were prepared in the same manner as in Example 1, except that this proton-conductive inorganic oxide with the catalyst supported thereon was used. The anode was formed of a 50 μm-thick catalyst layer and had a Pt catalyst level of 4.2 mg/cm$^2$. On the other hand, the cathode was formed of a 50 μm-thick catalyst layer and had a Pt catalyst level of 4.3 mg/cm$^2$.

Example 8

A catalyst carrier of F-doped $SnO_2$, in which the level of F (fluorine) doped was 5% by mole, was prepared in the same manner as in Example 2, except that tin tetrachloride pentahydrate $SnCl_4.5H_2O$ was changed to 0.11 g of ammonium fluoride $NH_4F$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising chromium oxide supported on the surface of the catalyst carrier was provided. In this case, the ratio of chromium (Cr) element to fluorine (F) element and tin (Sn) element in F-doped $SnO_2$ was 0.1. Further, a PtRu catalyst and a Pt catalyst were supported on the surface of the proton-conductive inorganic oxide. In this case, the level of PtRu was 12% based on the total weight, and the level of Pt was 14% based on the total weight.

An anode and a cathode were prepared in the same manner as in Example 2, except that this proton-conductive inorganic oxide with the catalyst supported thereon was used. The anode was formed of a 51 μm-thick catalyst layer and had a Pt catalyst level of 4.2 mg/cm$^2$. On the other hand, the cathode was formed of a 50 μm-thick catalyst layer and had a Pt catalyst level of 4.3 mg/cm$^2$.

Example 9

A catalyst carrier of F-doped $SnO_2$, in which the level of F (fluorine) doped was 5% by mole, was prepared in the same manner as in Example 3, except that tin tetrachloride pentahydrate $SnCl_4.5H_2O$ was changed to 0.11 g of ammonium fluoride $NH_4F$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising molybdenum oxide supported on the surface of the catalyst carrier was provided. In this case, the ratio of molybdenum (Mo) element to fluorine (F) element and tin (Sn) element in F-doped $SnO_2$ was 0.1. Further, a PtRu catalyst and a Pt catalyst were supported on the surface of the proton-conductive inorganic oxide. In this case, the level of PtRu was 13% based on the total weight, and the level of Pt was 12% based on the total weight.

An anode and a cathode were prepared in the same manner as in Example 4, except that this proton-conductive inorganic oxide with the catalyst supported thereon was used. The anode was formed of a 53 μm-thick catalyst layer and had a Pt catalyst level of 4.2 mg/cm$^2$. On the other hand, the cathode was formed of a 50 μm-thick catalyst layer and had a Pt catalyst level of 4.1 mg/cm$^2$.

Example 10

A catalyst carrier of F-doped $SnO_2$, in which the level of F (fluorine) doped was 5% by mole, was prepared in the same manner as in Example 3, except that tin tetrachloride pentahydrate $SnCl_4.5H_2O$ was changed to 0.11 g of ammonium fluoride $NH_4F$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising tungsten oxide supported on the surface of the catalyst carrier was provided. In this case, the ratio of tungsten (W) element to fluorine (F) element and tin (Sn) element in F-doped $SnO_2$ was 0.1. Further, a PtRu catalyst and a Pt catalyst were supported on the surface of the proton-conductive inorganic oxide. In this case, the level of PtRu was 13% based on the total weight, and the level of Pt was 10% based on the total weight.

An anode and a cathode were prepared in the same manner as in Example 5, except that this proton-conductive inorganic oxide with the catalyst supported thereon was used. The anode was formed of a 53 μm-thick catalyst layer and had a Pt catalyst level of 4.4 mg/cm². On the other hand, the cathode was formed of a 50 μm-thick catalyst layer and had a Pt catalyst level of 4.1 mg/cm².

Example 11

A catalyst carrier of Sb-doped $SnO_2$, in which the level of Sb (antimony) doped was 5% by mole, was prepared in the same manner as in Example 1, except that tin tetrachloride pentahydrate $SnCl_4.5H_2O$ was changed to 0.7 g of antimony chloride $SbCl_3$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising boron oxide supported on the surface of the catalyst carrier was provided. In this case, the ratio of boron (B) element to antimony (Sb) element and tin (Sn) element in Sb-doped $SnO_2$ was 0.1. Further, a PtRu catalyst and a Pt catalyst were supported on the surface of the proton-conductive inorganic oxide. In this case, the level of PtRu was 11% based on the total weight, and the level of Pt was 12% based on the total weight.

An anode and a cathode were prepared in the same manner as in Example 1, except that this proton-conductive inorganic oxide with the catalyst supported thereon was used. The anode was formed of a 50 μm-thick catalyst layer and had a Pt catalyst level of 4.2 mg/cm². On the other hand, the cathode was formed of a 51 μm-thick catalyst layer and had a Pt catalyst level of 4.3 mg/cm².

Example 12

A catalyst carrier of Sb-doped $SnO_2$, in which the level of Sb (antimony) doped was 5% by mole, was prepared in the same manner as in Example 2, except that tin tetrachloride pentahydrate $SnCl_4.5H_2O$ was changed to 0.7 g of antimony chloride $SbCl_3$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising vanadium oxide supported on the surface of the catalyst carrier was provided. In this case, the ratio of vanadium (V) element to antimony (Sb) element and tin (Sn) element in Sb-doped $SnO_2$ was 0.1. Further, a PtRu catalyst and a Pt catalyst were supported on the surface of the proton-conductive inorganic oxide. In this case, the level of PtRu was 11% based on the total weight, and the level of Pt was 10% based on the total weight.

An anode and a cathode were prepared in the same manner as in Example 2, except that this proton-conductive inorganic oxide with the catalyst supported thereon was used. The anode was formed of a 52 μm-thick catalyst layer and had a Pt catalyst level of 4.1 mg/cm². On the other hand, the cathode was formed of a 51 μm-thick catalyst layer and had a Pt catalyst level of 4.2 mg/cm².

Example 13

A catalyst carrier of Sb-doped $SnO_2$, in which the level of Sb (antimony) doped was 5% by mole, was prepared in the same manner as in Example 3, except that tin tetrachloride pentahydrate $SnCl_4.5H_2O$ was changed to 0.7 g of antimony chloride $SbCl_3$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising chromium oxide supported on the surface of the catalyst carrier was provided. In this case, the ratio of chromium (Cr) element to antimony (Sb) element and tin (Sn) element in Sb-doped $SnO_2$ was 0.1. Further, a PtRu catalyst and a Pt catalyst were supported on the surface of the proton-conductive inorganic oxide. In this case, the level of PtRu was 10% based on the total weight, and the level of Pt was 12% based on the total weight.

An anode and a cathode were prepared in the same manner as in Example 3, except that this proton-conductive inorganic oxide with the catalyst supported thereon was used. The anode was formed of a 50 μm-thick catalyst layer and had a Pt catalyst level of 4.0 mg/cm². On the other hand, the cathode was formed of a 54 μm-thick catalyst layer and had a Pt catalyst level of 4.3 mg/cm².

Example 14

A catalyst carrier of Sb-doped $SnO_2$, in which the level of Sb (antimony) doped was 5% by mole, was prepared in the same manner as in Example 4, except that tin tetrachloride pentahydrate $SnCl_4.5H_2O$ was changed to 0.7 g of antimony chloride $SbCl_3$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising molybdenum oxide supported on the surface of the catalyst carrier was provided. In this case, the ratio of molybdenum (Mo) element to antimony (Sb) element and tin (Sn) element in Sb-doped $SnO_2$ was 0.1. Further, a PtRu catalyst and a Pt catalyst were supported on the surface of the proton-conductive inorganic oxide. In this case, the level of PtRu was 13% based on the total weight, and the level of Pt was 12% based on the total weight.

An anode and a cathode were prepared in the same manner as in Example 4, except that this proton-conductive inorganic oxide with the catalyst supported thereon was used. The anode was formed of a 52 μm-thick catalyst layer and had a Pt catalyst level of 4.1 mg/cm². On the other hand, the cathode was formed of a 53 μm-thick catalyst layer and had a Pt catalyst level of 4.2 mg/cm².

Example 15

A catalyst carrier of Sb-doped $SnO_2$, in which the level of Sb (antimony) doped was 5% by mole, was prepared in the same manner as in Example 5, except that tin tetrachloride pentahydrate $SnCl_4.5H_2O$ was changed to 0.7 g of antimony chloride $SbCl_3$, and indium nitrate trihydrate $In(NO_3).3H_2O$ was changed to 20 g of tin tetrachloride pentahydrate $SnCl_4.5H_2O$.

Subsequently, a proton-conductive inorganic oxide comprising tungsten oxide supported on the surface of the catalyst carrier was provided. In this case, the ratio of tungsten (W) element to antimony (Sb) element and tin (Sn) element in Sb-doped $SnO_2$ was 0.1. Further, a PtRu catalyst and a Pt catalyst were supported on the surface of the proton-conductive inorganic oxide. In this case, the level of PtRu was 11% based on the total weight, and the level of Pt was 12% based on the total weight.

An anode and a cathode were prepared in the same manner as in Example 5, except that this proton-conductive inorganic oxide with the catalyst supported thereon was used. The anode was formed of a 51 μm-thick catalyst layer and had a Pt catalyst level of 4.3 mg/cm². On the other hand, the cathode was formed of a 52 μm-thick catalyst layer and had a Pt catalyst level of 4.4 mg/cm².

Comparative Example 1

A material prepared by impregnating a 5% Nafion solution into an electrode containing a 10% PtRu-supported carbon as an anode catalyst (catalyst amount: PtRu 4 mg/cm$^2$, manufactured by E-tek) was provided as an anode. Further, a material prepared by impregnating a 5% Nafion solution into an electrode containing a 10% Pt-supported carbon as a cathode catalyst (catalyst amount: Pt 4 mg/cm$^2$, manufactured by E-tek) was provided as a cathode.

Comparative Example 2

A mixed solution prepared by adding 5 g of silicon oxide $SiO_2$ to 300 ml of distilled water containing 2 g of vanadium chloride $VCl_3$ dissolved therein was heated to 80° C. while always stirring the mixed solution, and water was removed at an evaporation rate of 100 ml/hr. Thereafter, the mixed solution was further held in a drier of 100° C. for 12 hr to give powder. This powder was ground in an agate mortar to give ground powder. The ground powder was then heated in an alumina crucible to 600° C. at a temperature rise rate of 100° C./hr and was held at 600° C. for 4 hr to give vanadium oxide-supported silicon oxide having an element ratio of vanadium element (X) in vanadium oxide to silicon element (Y) in silicon oxide, that is, X/Y, of 0.1 and a specific surface area of 55 m$^2$/g. The vanadium oxide-supported silicon oxide was analyzed by X-ray diffractometry. As a result, all diffraction peaks observed were those belonging to silicon oxide, and it could be confirmed that vanadium oxide had an amorphous structure.

Thereafter, 0.5 g of a 10% Pt-supported carbon powder was mixed with 0.5 g of an oxide superacid powder prepared in the above step, 1 g of a 5% aqueous PVA solution, 1 g of ethanol, and 1 g of water. This mixture, together with zirconia balls, was transferred to a hermetically sealed vessel and was mixed in a bench ball mill for 6 hr to prepare a cathode catalyst slurry. This slurry was coated onto a carbon paper, and the coated carbon paper was dried at 60° C. for one hr. This electrode was fired in a nitrogen gas stream at 150° C. for one hr to prepare a cathode. The cathode thus obtained comprised a 52-μm catalyst layer and had a Pt catalyst level of 4.2 mg/cm$^2$.

Separately, 0.5 g of a 10% PtRu-supported carbon powder was mixed with 0.5 g of an oxide superacid powder prepared in the above step, 1 g of a 5% aqueous PVA solution, 1 g of ethanol, and 1 g of water. This mixture, together with zirconia balls, was transferred to a hermetically sealed vessel and was mixed in a bench ball mill for 6 hr to prepare an anode catalyst slurry. This slurry was coated onto a carbon paper, and the coated carbon paper was dried at 60° C. for one hr. Further, the electrode was fired in a nitrogen stream at 150° C. for one hr to prepare an anode. This anode comprised a 51 μm-thick catalyst layer and had a PtRu catalyst level of 4.5 mg/cm$^2$.

The catalyst layer in the anode electrode and the catalyst layer in the cathode electrode prepared in Examples 1 to 15 were separated from the carbon paper and were ground. The proton-conductive inorganic oxide was found with an acid indicator comprising m-nitrotoluene (pKa=−11.99), p-nitrofluorobenzene (pKa=−12.40), p-nitrochlorobenzene (pKa=−12.70), m-nitrochlorobenzene (pKa=−13.16), 2,4-dinitrotoluene (pKa=−13.75), 2,4-dinitrofluorobenzene (pKa=−14.52), or 1,3,5-trinitrobenzene (pKa=−16.04) to have solid superacidity. When the oxide superacid has been colored, it is difficult to evaluate solid acidity from a change in color of the acid indicator. In this case, the solid superacidity can also be measured by ammonia thermal desorption analysis (TPD). In this method, ammonia gas is adsorbed to a solid acid sample, and the temperature of the sample is raised to detect and analyze the amount of ammonia desorbed and the temperature of desorption. For each proton-conductive inorganic oxide, the Hammett acidity function $H_0$ was as shown in Table 1.

The volume resistivity of the electron-conductive proton-conductive inorganic oxide with the catalyst prepared in each of Examples 1 to 15 supported thereon was measured by a four probe method as follows. At the outset, 1 g of a powder sample was compressed into pellets with a diameter of 10 mm. Four probes were brought into contact with the surface of the pellet so that the probes were arranged in a straight line at intervals of 0.3 mm. Current was applied across the two outer probes, and the potential difference was measured between the two inner probes to determine the volume resistivity. For each proton-conductive inorganic oxide, the volume resistivity was as shown in Table 1.

Figure 3:
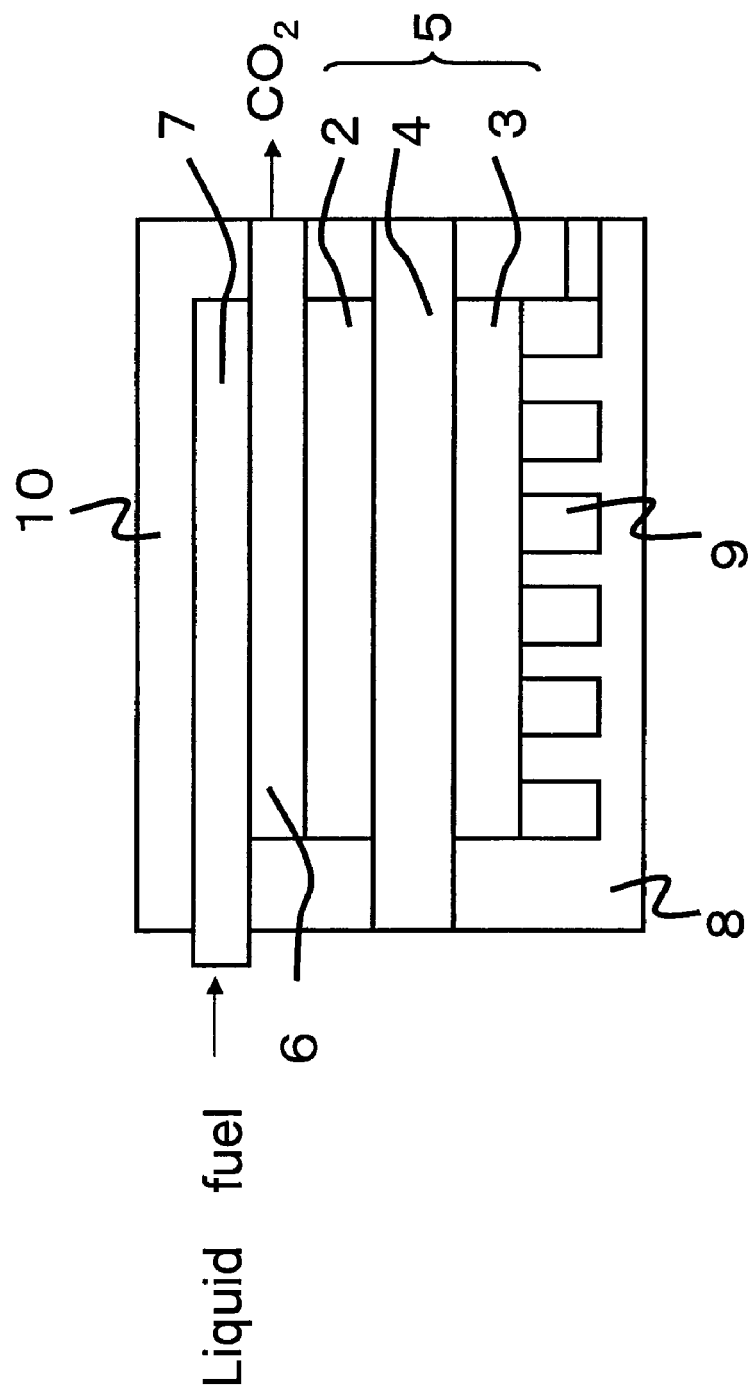
FIG. 3 is a typical cross-sectional view of the construction of a liquid fuel cell prepared in a working example.

A liquid fuel cell was assembled by the following method using the electrodes prepared in each of Examples 1 to 15 and Comparative Examples 1 and 2. FIG. 3 shows a typical cross-sectional view of the liquid fuel cell.

A perfluorosulfonic acid film (tradename: Nafion 117 film, manufactured by Du Pont) was disposed as a proton-conductive film 4 between a fuel electrode 2 and an oxidizing agent electrode 3, and the assembly was hot pressed under conditions of temperature 120° C., time 5 min, and pressure 100 kg/cm$^2$ for joint to prepare a membrane electrode composite, whereby an electromotive part 5 was formed.

A porous carbon plate having an average pore diameter of 100 μm and a porosity of 70% was stacked as a fuel vaporization part 6 in the electromotive part 5 at its fuel electrode 2. A porous carbon plate having an average pore diameter of 5 μm and a porosity of 40% was disposed as a fuel penetration part 7 on the fuel vaporization part 6. They were incorporated in an oxidizing agent electrode holder 8 with oxidizing agent gas supply grooves 9, and a fuel electrode holder 10 to prepare a unit cell having a construction as shown in FIG. 3. This unit cell had a reaction area of 10 cm$^2$. The oxidizing agent gas supply grooves 9 in the oxidizing agent electrode holder 8 had a depth of 2 mm and a width of 1 mm.

A 20% aqueous methanol solution was introduced into the liquid fuel cell thus obtained from the side face of the fuel penetration part 7 by taking advantage of capillary force as shown in FIG. 3. On the other hand, air of 1 atm as an oxidizing agent gas was allowed to flow at 100 ml/min into a gas channel 9 for power generation. Carbon dioxide ($CO_2$) generated upon a power generation reaction was released from the fuel vaporization part 6 as shown in FIG. 3. The maximum electric power generation was as shown in Table 1.

The cell resistance of the liquid fuel cell was measured by applying an alternating voltage of 1 kHz across current take-out plates in contact with a carbon cell holder and measuring the flown current value with a resistance meter. The measured cell resistance values were as shown in Table 1.

For each of the membrane electrode composites, the cell resistance and the maximum electric power generation in use of a 20% aqueous methanol solution were measured. The results thus obtained were as shown in Table 1.

TABLE 1

| | Element Y in oxide B | Element X-containing catalyst carrier A | Dope level of additive element in catalyst carrier A (mol %) | Element ratio ($M_Y/M_X$) | Acidity function $H_0$ | Volume resistivity ($\Omega$cm) | Cell resistance (m$\Omega$) | Max. electric power generation in use of 20% aqueous methanol solution (mW/cm$^2$) |
|---|---|---|---|---|---|---|---|---|
| Ex. 1 | B | Sn-doped $In_2O_3$ | 5 | 0.1 | −11.99 | 0.25 | 15.4 | 28.0 |
| Ex. 2 | V | Sn-doped $In_2O_3$ | 5 | 0.1 | −12.40 | 0.21 | 15.0 | 28.5 |
| Ex. 3 | Cr | Sn-doped $In_2O_3$ | 5 | 0.1 | −12.70 | 0.24 | 14.5 | 29.3 |
| Ex. 4 | Mo | Sn-doped $In_2O_3$ | 5 | 0.1 | −13.16 | 0.22 | 13.9 | 30.6 |
| Ex. 5 | W | Sn-doped $In_2O_3$ | 5 | 0.1 | −13.75 | 0.21 | 13.4 | 31.2 |
| Ex. 6 | B | F-doped $SnO_2$ | 5 | 0.1 | −12.40 | 0.52 | 12.7 | 32.0 |
| Ex. 7 | V | F-doped $SnO_2$ | 5 | 0.1 | −12.70 | 0.53 | 12.2 | 32.4 |
| Ex. 8 | Cr | F-doped $SnO_2$ | 5 | 0.1 | −13.16 | 0.52 | 11.6 | 33.1 |
| Ex. 9 | Mo | F-doped $SnO_2$ | 5 | 0.1 | −13.75 | 0.51 | 11.3 | 33.2 |
| Ex. 10 | W | F-doped $SnO_2$ | 5 | 0.1 | −14.50 | 0.52 | 10.8 | 34.3 |
| Ex. 11 | B | Sb-doped $SnO_2$ | 5 | 0.1 | −12.70 | 3.20 | 10.5 | 34.7 |
| Ex. 12 | V | Sb-doped $SnO_2$ | 5 | 0.1 | −13.16 | 3.30 | 9.8 | 35.2 |
| Ex. 13 | Cr | Sb-doped $SnO_2$ | 5 | 0.1 | −13.75 | 3.20 | 9.4 | 35.7 |
| Ex. 14 | Mo | Sb-doped $SnO_2$ | 5 | 0.1 | −14.50 | 3.10 | 8.6 | 36.3 |
| Ex. 15 | W | Sb-doped $SnO_2$ | 5 | 0.1 | −15.00 | 3.20 | 8.2 | 36.7 |
| Comp. Ex. 1 | — | — | — | — | — | — | 30.0 | 2.0 |
| Comp. Ex. 2 | V | $SiO_2$ | — | 0.1 | −12.40 | — | 25.0 | 13.0 |

As is apparent from Table 1, the electrodes prepared in Examples 1 to 15 had significantly lowered cell resistance as compared with the electrodes of Comparative Example 1 using a Nafion solution as a catalyst layer binder.

As is apparent from Comparative Example in Table 1, in a fuel cell provided with the electrode using a Nafion solution in the catalyst layer, for a 20% aqueous methanol solution, no satisfactory methanol reaction took place in the catalyst layer, the methanol crossover significantly affected the output, and the cell resistance was significantly large. As a result, the electric power generation was only 2.0 mW/cm$^2$ at the highest.

As shown in Comparative Example 2 in Table 1, the fuel cell comprising an electrode comprising a catalyst layer using a proton-conductive inorganic oxide prepared by supporting vanadium oxide on the surface of $SiO_2$ had no electron conductivity and, thus, had high cell resistance and also had low maximum electric power generation. On the other hand, when the fuel cells comprising an electrode using the proton-conductive inorganic oxides prepared in Examples 1 to 15 were used as a support material for the catalyst, a good electrode reaction took place. Further, in this case, the resistance of the catalyst layer was low, and the cell resistance was low. Consequently, good electric power generation could be realized. Regarding the catalyst carrier, Sn-doped $In_2O_3$ had the lowest volume resistivity. Regarding the proton-conductive inorganic oxide, the fuel cells of Examples 11 to 15 using Sb-doped $SnO_2$ as a catalyst carrier had large electric power generation, and the fuel cell of Example 15 with tungsten oxide particles supported thereon had the largest electric power generation.

For the unit cells of Examples 1 to 15 with an electrode using an oxide superacid in a binder in the catalyst layer, a 20% aqueous methanol solution was supplied as a fuel, and air was allowed to flow into the cell. Further, both sides of the cell was heated to 40° C., a current of 10 mA/cm$^2$ was withdrawn, and temporal stability of cell performance was observed. As a result, the output was stable even after the elapse of a few hours.

For the fuel cell comprising, as an electrolyte membrane, an electrode (Comparative Example 1) using a Nafion solution in the catalyst layer binder, a 20% aqueous methanol solution was supplied as a fuel, and air was allowed to flow into the cell. Further, both sides of the cell was heated to 40° C., a current of 10 mA/cm$^2$ was withdrawn, and the temporal stability of cell performance was observed. As a result, the electric power became impossible to be output within a few minutes.

Example 16

A catalyst carrier of Sn-doped $In_2O_3$, in which the level of Sn (tin) doped was 0.5% by mole, was prepared in the same manner as in Example 4, except that the amount of tin tetrachloride pentahydrate $SnCl_4.5H_2O$ was changed from 1 g to 0.1 g.

Subsequently, a proton-conductive inorganic oxide comprising molybdenum oxide supported on the surface of the catalyst carrier was provided. In this case, the ratio of molybdenum (Mo) element to Tin (Sn) element and indium (In) element in Sn-doped $InO_2$ was 0.1. Further, a PtRu catalyst and a Pt catalyst were supported on the surface of the proton-conductive inorganic oxide. In this case, the level of PtRu was 12% based on the total weight, and the level of Pt was 13% based on the total weight.

An anode and a cathode were prepared in the same manner as in Example 4, except that this proton-conductive inorganic oxide with the catalyst supported thereon was used. The anode was formed of a 54 µm-thick catalyst layer and had a Pt catalyst level of 4.2 mg/cm$^2$. On the other hand, the cathode was formed of a 51 µm-thick catalyst layer and had a Pt catalyst level of 4.0 mg/cm$^2$.

Example 17

A catalyst carrier of Sn-doped $In_2O_3$, in which the level of Sn (tin) doped was 10% by mole, was prepared in the same manner as in Example 4, except that the amount of tin tetrachloride pentahydrate $SnCl_4.5H_2O$ was changed from 1 g to 2.2 g.

Subsequently, a proton-conductive inorganic oxide comprising molybdenum oxide supported on the surface of the catalyst carrier was provided. In this case, the ratio of molybdenum (Mo) element to tin (Sn) element and indium (In)

element in Sn-doped $InO_2$ was 0.1. Further, a PtRu catalyst and a Pt catalyst were supported on the surface of the proton-conductive inorganic oxide. In this case, the level of PtRu was 11% based on the total weight, and the level of Pt was 14% based on the total weight.

An anode and a cathode were prepared in the same manner as in Example 4, except that this proton-conductive inorganic oxide with the catalyst supported thereon was used. The anode was formed of a 51 µm-thick catalyst layer and had a Pt catalyst level of 4.3 mg/cm². On the other hand, the cathode was formed of a 50 µm-thick catalyst layer and had a Pt catalyst level of 4.2 mg/cm².

For the fuel cells prepared in Examples 16 and 17, the acidity function, volume resistivity, cell resistance, and the maximum electric power generation using a 20% aqueous methanol solution were measured in the same manner as described above. The results were as shown in Table 2 below. The results of Example 4 are also shown in Table 2.

to remove the solvent and thus to form an electrolyte membrane. The ratio of the proton-conductive inorganic material (S) to the total weight of the membrane (T), that is, S/T, was 0.9, and the electrolyte membrane had a thickness of 150 µm.

A fuel cell was prepared in the same manner as in Example 1, except that the fuel electrode and oxidizing agent (oxidizer) electrode prepared in Example 1 and the proton-conductive film prepared in Example 18 were used.

For the fuel cell prepared in Example 18, the cell resistance of the fuel cell and the maximum electric power generation in use of a 20% methanol solution were measured. The results thus obtained were as shown in Table 3 below. The results of Example 1 and Comparative Example 1 are also shown in Table 3.

TABLE 2

|  | Element Y in oxide B | Element X-containing catalyst carrier A | Dope level of additive element in catalyst carrier A (mol %) | Element ratio ($M_Y/M_X$) | Acidity function $H_0$ | Volume resistivity (Ωcm) | Cell resistance (mΩ) | Max. electric power generation in use of 20% aqueous methanol solution (mW/cm²) |
|---|---|---|---|---|---|---|---|---|
| Ex. 4 | Mo | Sn-doped $In_2O_3$ | 5 | 0.1 | −13.16 | 0.22 | 13.9 | 30.6 |
| Ex. 16 | Mo | Sn-doped $In_2O_3$ | 0.5 | 0.1 | −13.16 | 8.00 | 23.1 | 20.5 |
| Ex. 17 | Mo | Sn-doped $In_2O_3$ | 10 | 0.1 | −13.16 | 1.00 | 18.1 | 25.2 |

As is apparent from Table 2, a change in addition amount of elements added to the catalyst carrier resulted in a change in volume resistivity. It was found that the change in volume resistivity in turn resulted in a change in cell resistance and maximum electric power generation.

Example 18

A mixed solution prepared by adding 5 g of silicon oxide $SiO_2$ to 300 ml of distilled water containing 2 g of vanadium chloride $VCl_3$ dissolved therein was heated to 80° C. while always stirring the mixed solution, and water was removed at an evaporation rate of 100 ml/hr. Thereafter, the mixed solution was further held in a drier of 100° C. for 12 hr to give powder. This powder was ground in an agate mortar to give ground powder. The ground powder was then heated in an alumina is crucible to 600° C. at a temperature rise rate of 100° C./hr and was held at 600° C. for 4 hr to give vanadium oxide-supported silicon oxide having an element ratio of vanadium element (X) in vanadium oxide to silicon element (Y) in silicon oxide, that is, X/Y, of 0.1 and a specific surface area of 53 m²/g. The vanadium oxide-supported silicon oxide was analyzed by X-ray diffractometry. As a result, all diffraction peaks observed were those belonging to silicon oxide, and it could be confirmed that vanadium oxide had an amorphous structure.

The proton-conductive inorganic material powder (1 g) was added to 2 g of a 5% aqueous polyvinyl alcohol (PVA) solution, and the mixture was stirred at room temperature for 10 min to prepare a slurry. The slurry was placed in an ethylene tetrafluoride-perfluoroalkoxy vinyl ether copolymer (PFA) resin schale and was dried in air at 60° C. and 150° C.

TABLE 3

|  | Fuel electrode | Electrolyte membrane | Oxidizer electrode | Cell resistance (mΩ) | Max. electric power generation in use of 20% aqueous methanol solution (mW/cm²) |
|---|---|---|---|---|---|
| Ex. 1 | Proton-conductive inorganic oxide | Perfluoro-sulfonic acid-containing polymer | Proton-conductive inorganic oxide | 15.4 | 28 |
| Ex. 18 | Proton-conductive inorganic oxide | Proton-conductive inorganic oxide | Proton-conductive inorganic oxide | 10.2 | 40 |
| Comp. Ex. 1 | Perfluoro-sulfonic acid-containing polymer | Perfluoro-sulfonic acid-containing polymer | Perfluoro-sulfonic acid-containing polymer | 30.0 | 2 |

As is apparent from Table 3, since the proton-conductive material used in the electrode and the electrolyte membrane had low resistance and thus had low cell resistance, the membrane electrode composites prepared in Example 1 and Example 18 had higher output properties than those of the membrane electrode composite prepared in Comparative Example 1.

As described above in detail, according to the present invention, fuel cells, which are small in size, are high in performance, and can realize the supply of stable output, can be provided, and, thus, the present invention is very valuable in industry.

Additional advantage and modifications will readily occur to those skilled in the art. Therefore, the invention in its broader aspect is not limited to the specific details and representative embodiments shown and described herein. Accordingly, various modifications may be made without departing from the appended claims and their equivalents.

The invention claimed is:

1. An electrode for a fuel cell, comprising a catalyst layer, wherein the catalyst layer comprises
a catalyst composite and
a binder,
where the catalyst composite comprises
a proton-conductive inorganic oxide and
an oxidation-reduction catalyst phase,
the proton-conductive inorganic oxide comprising
a catalyst carrier comprising at least one material selected from the group consisting of tin(Sn)-doped $In_2O_3$, fluorine(F)-doped $SnO_2$, and antimony(Sb)-doped $SnO_2$ and
an amorphous oxide particle phase chemically bonded to a surface of the catalyst carrier and comprising at least one element selected from the group consisting of tungsten (W), molybdenum (Mo), chromium (Cr), vanadium (V), and boron (B),
the oxidation-reduction catalyst phase being supported, directly or through the amorphous oxide particle phase, on the catalyst carrier.

2. The electrode according to claim 1, wherein the catalyst carrier has a volume resistivity of not less than $10^{-2}$ Ωcm and not more than $10^3$ Ωcm.

3. The electrode according to claim 1, wherein the content of the tin (Sn) element, fluorine (F) element, or antimony (Sb) element doped into the catalyst carrier is not less than 0.01% by mole and not more than 20% by mole.

4. The electrode according to claim 1, wherein the catalyst carrier is crystalline.

5. The electrode according to claim 1, wherein the number of moles $M_y$ of element Y, which comprises at least one element selected from the group consisting of W, Mo, Cr, V and B, to the number of moles $M_x$ of element X, which comprises Sn element and In element in Sn-doped $In_2O_3$, F element and Sn element in F-doped $SnO_2$, or Sb element and Sn element in Sb-doped $SnO_2$, i.e., $M_y/M_x$, is not less than 0.001 and not more than 20.

6. The electrode according to claim 1, wherein the catalyst carrier with the oxide particle phase supported thereon has a Hammett acidity function $H_0$ of $-20.00 < H_0 < -11.93$.

7. A membrane electrode composite comprising: a fuel electrode; an oxidizing agent electrode; an electrolyte membrane disposed between the fuel electrode and the oxidizing agent electrode,
wherein at least one of the fuel electrode and the oxidizing agent electrode comprises a catalyst layer, and the catalyst layer comprises
a catalyst composite and
a binder,
where the catalyst composite comprises
a proton-conductive inorganic oxide and
an oxidation-reduction catalyst phase,
the proton-conductive inorganic oxide comprising
a catalyst carrier comprising at least one material selected from the group consisting of tin(Sn)-doped $In_2O_3$, fluorine(F)-doped $SnO_2$, and antimony(Sb)-doped $SnO_2$ and
an amorphous oxide particle phase chemically bonded to a surface of the catalyst carrier and comprising at least one element selected from the group consisting of tungsten (W), molybdenum (Mo), chromium (Cr), vanadium (V), and boron (B),
the oxidation-reduction catalyst phase being supported, directly or through the amorphous oxide particle phase, on the catalyst carrier.

8. The membrane electrode composite according to claim 7, wherein the catalyst contained in the oxidation-reduction catalyst phase is selected from the group consisting of platinum, gold, silver, palladium, iridium, rhodium, ruthenium, iron, cobalt, nickel, chromium, tungsten, molybdenum, manganese, and vanadium.

9. The membrane electrode composite according to claim 7, wherein the catalyst has a particle diameter of not less than 1 nm and not more than 50 nm.

10. The membrane electrode composite according to claim 7, wherein the electrolyte membrane is a perfluorosulfonic acid-containing polymer electrolyte membrane.

11. A fuel cell comprising a fuel electrode, an oxidizing agent electrode, and an electrolyte membrane disposed between the fuel electrode and the oxidizing agent electrode,
wherein at least one of the fuel electrode and the oxidizing agent electrode comprises a catalyst layer, and the catalyst layer comprises
a catalyst composite and
a binder,
where the catalyst composite comprises
a proton-conductive inorganic oxide and
an oxidation-reduction catalyst phase,
the proton-conductive inorganic oxide comprising
a catalyst carrier comprising at least one material selected from the group consisting of tin(Sn)-doped $In_2O_3$, fluorine(F)-doped $SnO_2$, and antimony(Sb)-doped $SnO_2$ and
an amorphous oxide particle phase chemically bonded to a surface of the catalyst carrier and comprising at least one element selected from the group consisting of tungsten (W), molybdenum (Mo), chromium (Cr), vanadium (V), and boron (B),
the oxidation-reduction catalyst phase being supported, directly or through the amorphous oxide particle phase, on the catalyst carrier.

12. A method for manufacturing an electrode for a fuel cell, comprising:
dispersing a catalyst carrier in a solution comprising a substance comprising at least one element selected from the group consisting of tungsten (W), molybdenum (Mo), chromium (Cr), vanadium (V), and boron (B), dissolved therein, the catalyst carrier comprising at least one material selected from the group consisting of tin (Sn)-doped $I_2O_3$, fluorine(F)-doped $SnO_2$, and antimony(Sb)-doped $SnO_2$;
removing a solvent from the dispersion;
heat treating a residue to form an amorphous phase of an oxide of element Y and thus to form a proton-conductive inorganic oxide;
dispersing the proton-conductive inorganic oxide in a solution comprising a metal element-containing substance as a catalyst precursor dissolved therein;
removing a solvent from the dispersion or adjusting pH of the dispersion to deposit a catalyst precursor on a surface of the proton-conductive inorganic oxide to form a system;
heat treating the system in a reducing atmosphere to form a catalyst composite; and
mixing the catalyst composite with a binder and molding the mixture or coating the mixture onto a support.

13. The method according to claim 12, wherein the heat treatment for forming the proton-conductive oxide is carried out at 200 to 600° C.

\* \* \* \* \*